US006349291B1

(12) United States Patent
Varma

(10) Patent No.: US 6,349,291 B1
(45) Date of Patent: Feb. 19, 2002

(54) METHOD AND SYSTEM FOR ANALYSIS, DISPLAY AND DISSEMINATION OF FINANCIAL INFORMATION USING RESAMPLED STATISTICAL METHODS

(75) Inventor: Samir Varma, Greenwich, CT (US)

(73) Assignee: Attractor Holdings LLC, Greenwich, CT (US)

( * ) Notice: Subject to any disclaimer, the term of this patent is extended or adjusted under 35 U.S.C. 154(b) by 0 days.

(21) Appl. No.: 09/489,364

(22) Filed: Jan. 21, 2000

(51) Int. Cl.[7] .............................................. G06F 17/60

(52) U.S. Cl. .......................................... 705/35; 705/37

(58) Field of Search ............................ 705/35, 36, 37, 705/38

(56) References Cited

U.S. PATENT DOCUMENTS

| | | | | | |
|---|---|---|---|---|---|
| 4,541,115 A | * | 9/1985 | Werth | ........................ | 282/14 |
| 5,283,856 A | * | 2/1994 | Gross et al. | ................. | 395/51 |
| 5,359,699 A | * | 10/1994 | Tong et al. | ................... | 395/22 |
| 5,598,439 A | * | 1/1997 | Wagner | ..................... | 375/326 |
| 5,774,878 A | * | 6/1998 | Marshall | ..................... | 705/35 |
| 5,790,177 A | * | 8/1998 | Kassatly | ..................... | 348/13 |
| 5,893,069 A | * | 4/1999 | White, Jr. | ..................... | 705/1 |
| 5,918,217 A | * | 6/1999 | Maggioncalda et al. | ...... | 705/36 |
| 5,946,666 A | * | 8/1999 | Nevo et al. | ................... | 705/36 |
| 6,003,018 A | * | 12/1999 | Michaud et al. | ............. | 705/36 |
| 6,012,043 A | * | 1/2000 | Albright et al. | ............. | 705/36 |
| 6,064,662 A | * | 5/2000 | Makivic | ..................... | 705/36 |
| 6,064,984 A | * | 5/2000 | Ferguson et al. | ............ | 705/36 |

FOREIGN PATENT DOCUMENTS

| | | | |
|---|---|---|---|
| JP | 8-221573 | * | 8/1996 |
| JP | 8-221574 | * | 8/1996 |
| JP | 10-512985 | * | 12/1998 |

OTHER PUBLICATIONS

Hansson, B., and Persson, M. "Time Diversification and Estimation Risk", Financial Analysts Journal, vol. 56, No. 5 (Sep./Oct. 2000): pp. 55–62.*
Gardner, G., and Stone, D. "Estimating Currency Hedge Rations for International Portfolios", Financial Analysts Journal, vol. 51, No. 6 (Nov./Dec. 1995): start p. 6.*
Choong, N.K., and R. McLeod, Jr. "Expert, linear models, and nonlinear models of expert decision making in bankruptcy prediction: a lens model analysis", Journal of Management Information Systems, vol. 16, No. 1, (Summer 1999): pp. 189–206.*
Mitchell, M., and Stafford, E. "Managerial decisions and long–term stock price performance", The Journal of Business, vol. 73, No. 3 (Jul. 2000): pp. 287–329.*
Laster, D. "Measuring gains form international equity diversification: The boofstrap approach", journal of investing: New York; vol. 7, No. 3, (Fall 1998): pp. 52–60.*

(List continued on next page.)

Primary Examiner—Vincent Miller
Assistant Examiner—Daniel S Felten
(74) Attorney, Agent, or Firm—Kenyon & Kenyon

(57) ABSTRACT

The present invention provides a method and system for the statistical analysis, display and dissemination of financial data over an information network such as the Internet and WWW. The present invention utilizes resampled statistical methods for the analysis of financial data. Resampled statistical analysis provides a meaningful and reasonable statistical description of financial information, which typically escapes modeling using parametric methods (i.e. assumptions of a Gaussian distribution). The present invention provides at least a GUI that provides functionality for user input of statistical queries, a statistical computation engine that performs statistical analysis of financial data and a graphical rendering engine that generates graphical display of statistical distributions generated by the statistical computation engine. According to one embodiment, the present invention employs a parallel processing architecture to speed generation of the resampled statistics.

31 Claims, 17 Drawing Sheets

OTHER PUBLICATIONS

Kemp A. W. "Bootstrap Methods: A Practitioner's Guide", Biometrics, vol. 56, No. 1 (Mar. 2000): Start p. 317.*

Caudill, S., and Holcombe, R. "Specification search and levels of significance in econometric models", Eastern Econonic Journal, vol. 25, No. 3 (Summer 1999): pp. 289–300.*

Deis, D., and Hill, R., "An application of the bootstrap method to the simultaneous equations model of the demand and supply of audit services", Contemporary Accounting Research, vol. 15, No. 1 (Spring 1998): pp. 88–99.*

Magnar, L., and Steinar, E., "Exact confidence intervals generated by conditional parametric bootstrapping", Journal of Applied Statistics (May 1999): pp. 447–459.*

Coleman, M., Lynford, L., and James, F., "A newly integrated and dynamic approach to securitized real estate risk analysis and valuation" Real estate Finance, vol. 12, No. 1 (Spring 1995): Start p. 68.*

Putnam, B. "Is the trend still my friend?" Global Investor, No. 66, (Oct. 1993): Start p. 21.*

Fiellin, D., and Feinstein, A. "Bootstraps and jackknives: New computer–intensive statistical tools that require no mathematical theories" Journal of Investigative Medicine, vol. 46, No. 2, (Feb. 1998): start p. 22.*

Berkowitz, J., and Kilian, L., "Recent Developments in Bootstrapping Time Series", manuscript, Sep. 25, 1996.*

Michaud, R. The Markowitz Optimization Enigma: Is 'Optimized' Optimal?, Financial Analysts Journal, (Jan./Feb. 1989): pp. 31–42.*

* cited by examiner-

METHOD AND SYSTEM FOR ANALYSIS, DISPLAY AND DISSEMINATION OF FINANCIAL INFORMATION USING RESAMPLED STATISTICAL METHODS

FIELD OF THE INVENTION

The present invention relates to the area of electronic information systems. In particular, the present invention relates to a method and system for the delivery of financial information using resampled statistical methods over an information network.

BACKGROUND INFORMATION

Investors and financial analysts rely upon electronic information systems for the delivery of accurate financial and investment data and analysis in order to devise meaningful investment strategies. The growth of the Internet and World Wide Web ("WWW") highlights the potential for global distribution of "real time" or "near real time" financial information and analysis. For example, a number of WWW sites provide financial information to clients such as investors and financial analysts.

However, conventional financial information sites do not provide meaningful analysis tools to accurately analyze, forecast and predict the behavior of financial markets. Conventional technology for delivery of financial information over information networks such as the Internet typically allows users to track returns for various investments and perform rudimentary statistical analysis (e.g., computation of the mean and standard deviation) for these investments. However, these rudimentary statistical functions are not useful to investors in forecasting the behavior of financial markets because they rely upon assumptions that the underlying probability distribution function ("PDF") for the financial data follows a normal or Gaussian distribution, which is generally false.

The true distribution of returns for any financial market (and thus of a trading strategy) is unknown. It is therefore incorrect to rely upon a statistical model based on assumptions of normality (e.g., standard deviation). Typically, the PDF for financial market data is heavy tailed (i.e., the histograms of financial market data typically involve many outliers containing important information). Thus, statistical measures such as the standard deviation provide no meaningful insight into the distribution of financial data.

Providing reasonable methods for the analysis of financial market data is essential for investors. Reasonable statistical analysis of financial data should at a minimum provide an accurate assessment of potential financial risk and reward. However, conventional methods, which rely upon assumptions of a Gaussian distribution, are dangerous to investors because these analyses understate the true risk and overstate potential rewards for an investment or trading strategy. Thus, this information is not generally useful and if relied upon promotes imprudent investment decisions. In general, the heavy tailed nature of financial data presents significant challenges in providing meaningful statistical analysis.

SUMMARY OF THE INVENTION

The present invention provides a method and system for the statistical analysis, display and dissemination of financial data over an information network such as the Internet and WWW. The present invention utilizes resampled statistical methods for the analysis of financial data. Resampled statistical analysis provides a meaningful and reasonable statistical description of financial information, which typically escapes modeling using parametric methods (i.e., assumptions of a Gaussian distribution).

The present invention includes a financial information network node that is coupled to an information network such as the Internet. The financial information network node includes a front end subsystem, a resampled statistical analysis engine ("RSAE") and a graphics rendering engine ("GRE"). The front end subsystem provides a graphical user interface ("GUI") that allows clients also coupled to the information network to submit requests for resampled statistical analysis of various financial investments and receive graphical display of the results. The RSAE performs resampled statistical analysis of financial data in response to user queries and incorporates routines to preserve temporal correlation in financial data, which necessarily provides more accurate analysis. In addition, the RSAE provides for user control of a number of parameters to simulate various financial environmental conditions. For example, according to one embodiment, the RSAE allows a user to simulate either bull or bear market conditions by setting a bias parameter that controls a degree of randomness in the resampling process. The GRE generates a graphical display of statistical distributions generated by the RSAE.

According to one embodiment, the present invention employs a parallel processing architecture to speed generation of the resampled statistics. The parallel architecture is afforded by the nature of the resampling algorithm itself, which permits the financial data to be vectorized. This parallel processing architecture provides at least two significant advantages. First, the architecture permits the delivery and processing of financial data in compressed time frames, which facilitates "real time" or "near real time" statistical analysis. In addition, the parallel computation scheme provides the ability to perform statistical analysis on a large number of financial entities (e.g., a mutual fund or hedge fund) through a weighting process.

According to one embodiment of the present invention for implementation on the Internet, a financial information site is coupled to the Internet via a front end subsystem including a WWW server. The financial information site includes a front end subsystem, a RSAE and a GRE. In addition, the financial information site maintains a database of financial data for any number of financial entities such as companies, mutual funds etc. The financial information site also maintains a database of clients that have registered with the financial information site and desire to obtain statistical analysis of financial data.

In order to perform a resampled statistical analysis, a query is received from a client via the front end subsystem. A client may specify a number of parameters including an investment or investments (e.g., a portfolio) to be analyzed, a financial function, a sample size, a period, a type of plot and a bias parameter, which controls the randomness of the resampling process. Based upon the parameters specified by the client, the RSAE performs a resampled statistical analysis of relevant financial data. The GRE then produces a distribution plot based upon the output generated by the RSAE, which is presented to the client via the front end subsystem.

According to one embodiment of the present invention, the RSAE performs at least three types of financial functions on financial data. A gross rate of return function provides analysis of the gross rate of returns for an investment over a specified time period. A maximum drawdown function provides analysis of a maximum drawdown for an investment over a specified period. A monitor function provides analysis of a number of "up" and "down" days for a particular investment over a period of time.

The financial information site also provides functionality for storing a set of client specified alert rules that are used to automatically monitor the behavior of investments based upon a resampled statistical analysis process and notify clients of the financial information site when the behavior of a particular investment violates a specified rule.

DETAILED DESCRIPTION

Figure 1:
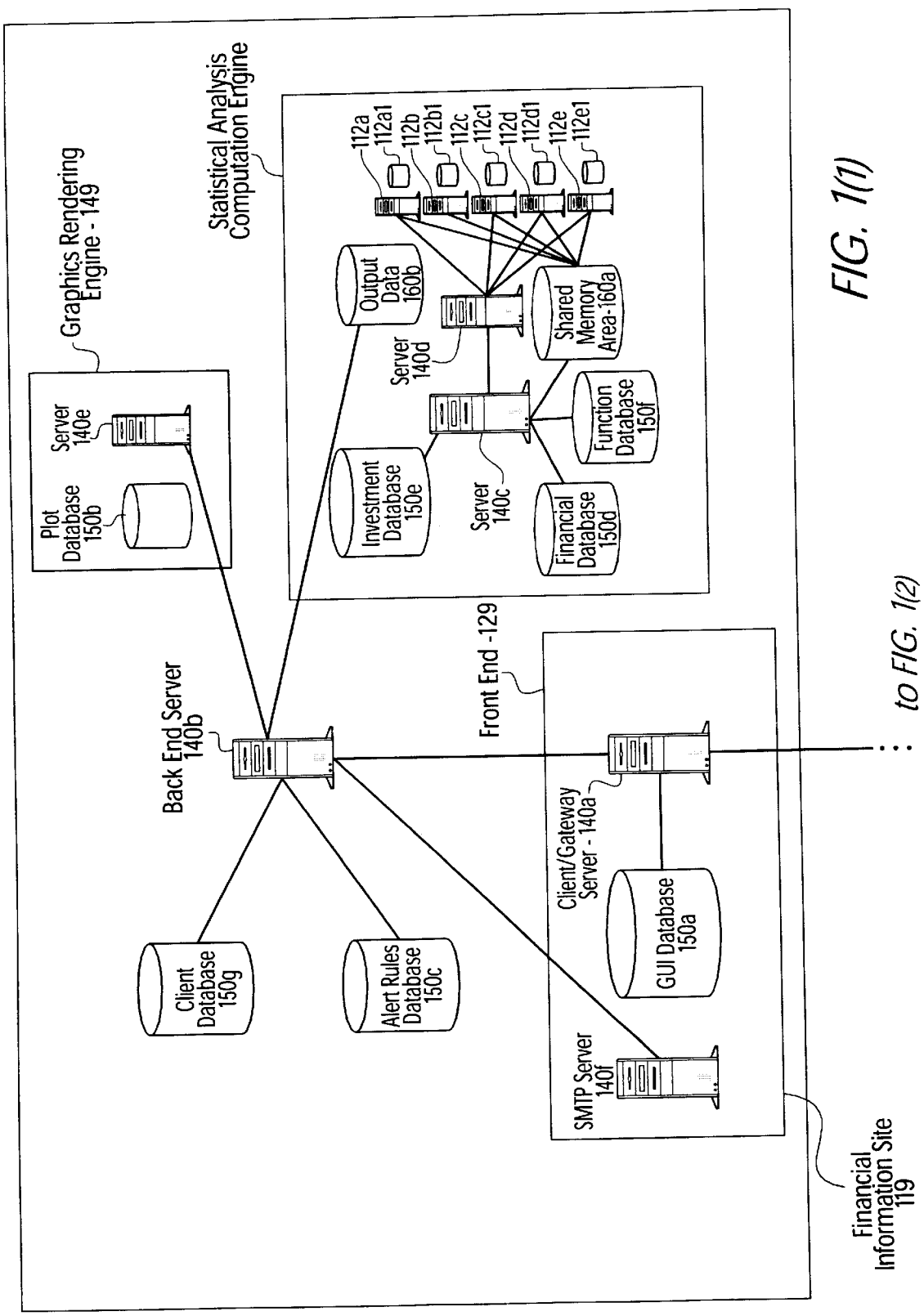
FIG. 1 is a block diagram of a network architecture that illustrates the relationship between a financial information site and a client according to one embodiment of the present invention.
Figure 1:
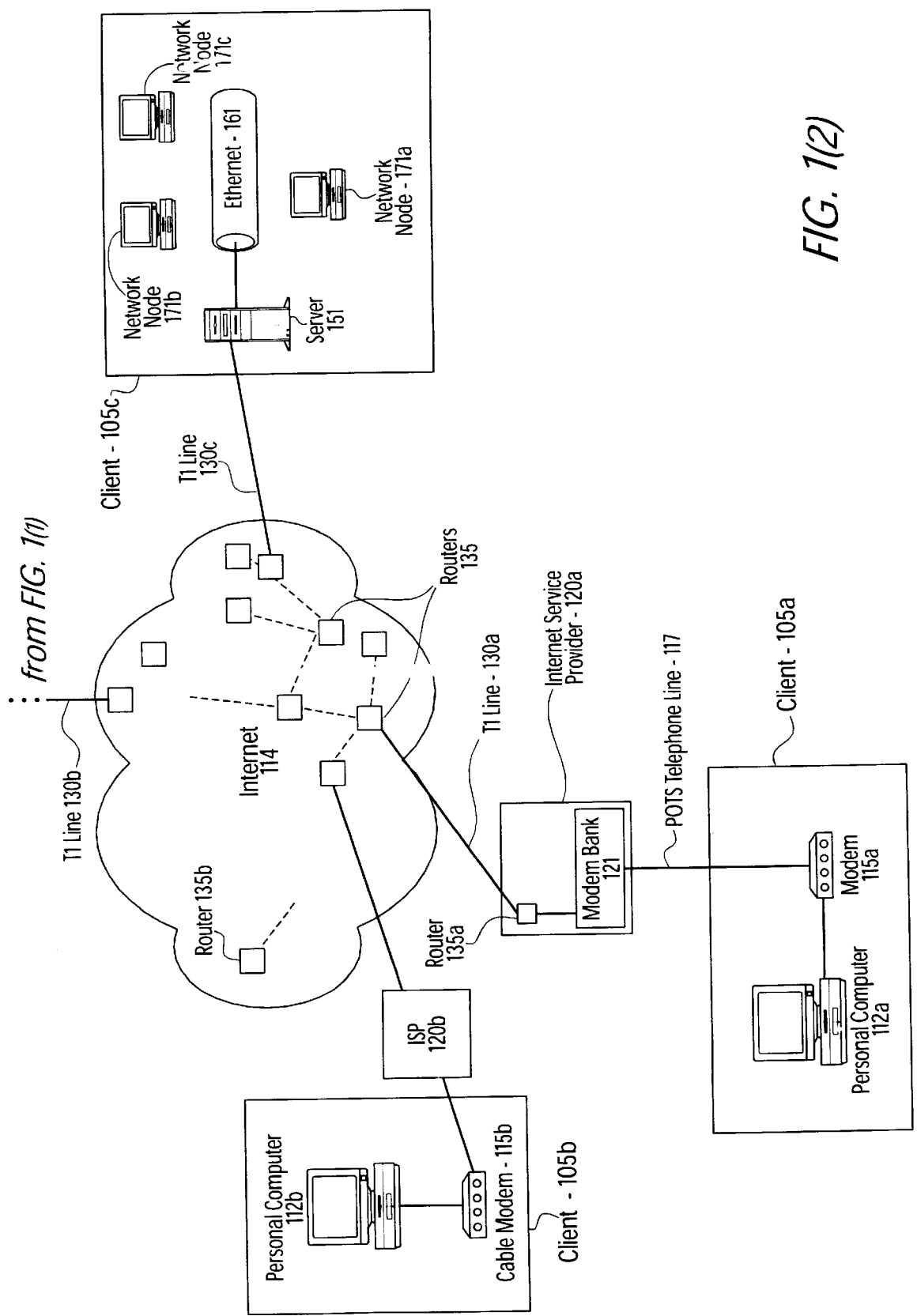

Although the embodiments described herein utilize the Internet and WWW, the present invention is compatible with any type of information network public or private and thus, the embodiments described herein are not intended to limit the scope of the claims appended hereto. For example, the present invention could be implemented using a private Intranet, local area network (LAN), metropolitan area network (MAN), wide area network (WAN) or even a wireless network FIG. 1 is a block diagram of a network topology that illustrates the relationship between the Internet, a financial information site and various clients according to one embodiment of the present invention. Based upon queries submitted by clients, financial information site 119 performs resampled statistical analysis of financial data and provides a graphical display of distribution results. Details of the functionality provided by financial information site 119 are described below.

Clients 105a–105c communicate with financial information site 119 via Internet 114. According to the embodiment depicted in FIG. 1, financial information site 119 is coupled to Internet 114 via T1 line 130b. Client 105a illustrates a typical narrowband client coupled to Internet 114 via a dial-up connection described in more detail below. Client 105b illustrates a typical broadband client coupled to Internet 114 via a cable modem. Client 105c illustrates a corporate client that is coupled to Internet via T1 line 130c and server 151. Corporate client 105c includes three network nodes 171a–171c that share bandwidth on Ethernet 161. Although FIG. 1 illustrates three clients (105a–105c), it is to be understood that financial information site 119 may serve any arbitrary number of clients 105 limited only by the processing power and bandwidth available.

As illustrated in FIG. 1, client 105a communicates with financial information site 119 via personal computer 112a, modem 115a, POTS telephone line 117 and Internet service provider 120a. Internet service provider 120a includes modem bank 121 and router 135a that routes packets received from modem bank 121 onto Internet 114 via T1 line 130a. Packets are routed over Internet 114 to client gateway server 140a at financial information site 119 via T1 line 130b.

Client 105a utilizes personal computer 112a to navigate Internet/World-Wide-Web (WWW 114 via browser software (not shown) and display device (not shown). The browser software permits navigation between various file servers connected to Internet 114, including client gateway server 140a at financial information site 119. The browser software also provides functionality for rendering of files distributed on the Internet (i.e., through plug-ins or Active X controls).

In order to transmit data to financial information site 119, personal computer 112a transmits signals through a dial-up connection utilizing modem 115a. Modem 115a performs modulation of digital signals generated by personal computer 112*a* onto an analog carrier signal for transmission over the public switched telephone network ("PSTN") (not shown). Modem 115*a* also performs demodulation of signals received over local lines (e.g., 117) from the PSTN extracting digital byte codes from a modulated analog carrier.

Signals are received at ISP 120*a*, which is connected to the PSTN through modem bank 121. Digital IP packets are then transmitted via Internet 114 and various routers (not shown) to WWW server 140*a*. IP packets are also transmitted in the reverse direction from WWW server 140*a* to personal computer 112*a*.

Client 105*b* is coupled to Internet 114 via a broadband cable connection. In particular, personal computer 112*b* transmits packets via cable modem 115*b* to ISP 120*b* where the packets are routed over Internet 114 to client gateway server 140*a*. Packets from financial information site 119 traverse a reverse path to client 105*b*. Similar to client 105*a*, client 105*b* utilizes browser software to navigate Internet 114 and WWW.

Corporate client 105*c* includes network nodes 171*a*–171*c*, which are coupled to Internet via Ethernet 161, server 151 and T1 line 130*c*. Network nodes 171*a*–171*c* may communicate with financial information site 119 via Ethernet, server 151, T1 line 130*c*, Internet 114 and T1 line 130*b*. Similar to clients 105*a*–105*b*, it is assumed that users at network nodes 171*a*–171*c* utilize browser software to navigate Internet 114 and WWW.

The specific nature of clients 105*a*–105*c* and the methods through which they are coupled to Internet 114 depicted in FIG. 1 are merely exemplary. The present invention is compatible with any type of Internet client and/or connection (broadband or narrowband). In general, it is to be understood that clients 105 may connect to Internet 114 using any potential medium whether it be a dedicated connection such as a cable modem, T1 line, DSL ("Digital Subscriber Line"), a dial-up POTS connection or even a wireless connection.

Figure 2:
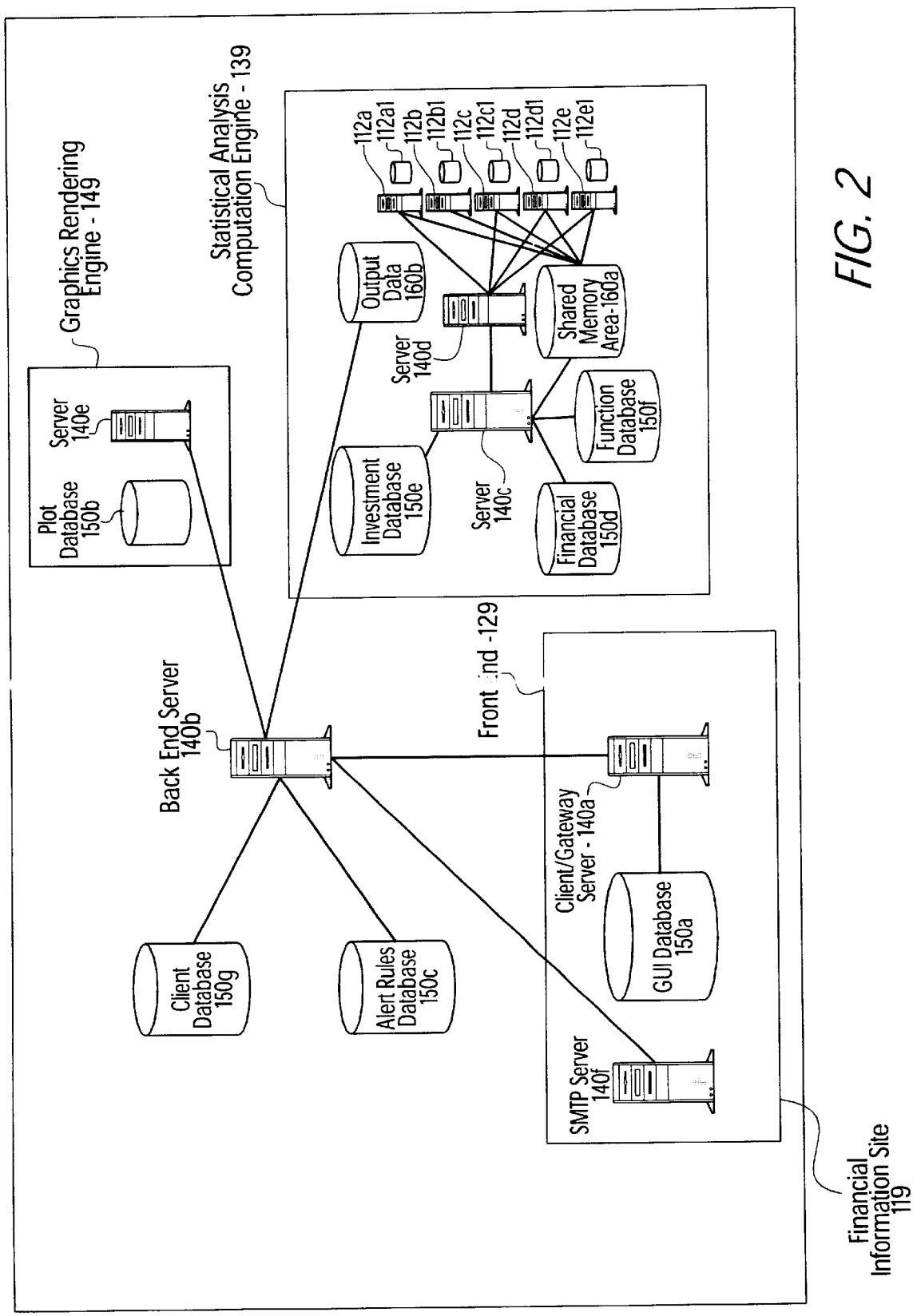
FIG. 2 is a detailed block diagram of a financial information site according to one embodiment of the present invention.

FIG. 2 is a detailed block diagram of a financial information site according to one embodiment of the present invention. Financial information site 119 includes front end subsystem 129, RSAE 139, GRE 149, back end server 140, client database 150*g* and alert rules database 150*c*.

Front end subsystem 129 includes client/gateway server 140*a*, which is coupled to GUI database 150*a*. Front end subsystem 129 provides a GUI, which allows clients 105 to transmit information to and receive information from financial information site 119. According to one embodiment GUI database 150*a* stores HTML ("Hypertext Markup Language") code (i.e., WWW pages) relating to various information and functions provided by financial information site 119. For example, GUI database 150*a* may store a HTML "home page" for financial information site 119 or HTML pages including forms, which allow the input of data at financial information site 119.

Front end subsystem 129 also includes SMTP ("Simple Mail Transport Protocol") server 140*f* SMTP server 140*f* performs transmission of e-mail messages to clients 105 associated with financial information site 119 in order to provide notification regarding various events (as described in more detail below).

Client gateway server 140*a* communicates with back end server 140*b*, which controls and orchestrates the large-scale processing of data at financial information site 119. In particular, back end server 140*b* handles responses to requests from clients 105 for resampled statistical analysis of investments. For example, back end server 140*b* submits requests to RSAE for resampled statistical analysis of financial data and submits requests to GRE for graphical rendering of output generated by RSAE. Back end server 140*b* communicates with control server 140*c* at RSAE 139, graphics rendering server 140*e* at GRE 149 and SMTP server 140*f* at front end 1 subsystem 29.

RSAE 139 includes control server 140*c*, parallel process control server 140*d*, parallel processors 112*a*–112*e* (each including local respective cache 112*a*1–112*e*1), financial database 150*d*, investment database 150*e*, function database 150*f*, shared memory area 160*a* and output data area 160*b*. Note that RSAE 139 depicted in FIGS. 1–2 utilizes a parallel processing architecture. This parallel scheme is merely exemplary and is not intended to limit the scope of the claims appended hereto. Other embodiments may not rely upon a parallel processing architecture at RSAE 139.

Control server 140*c* provides communication functions between back end server 140*b* and RSAE 139 and controls the overall operation of a resampled statistical analysis process. Control server 140*c* is coupled to parallel process control server 140*d* and shared memory area 160*a*. Shared memory area 160*a* stores sample data for financial investments currently being analyzed by RSAE 139. As described in detail below, control server 140*c* receives requests for parallel processing computations from back end server 140*b*, performs certain initialization functions, loads appropriate data into shared memory 160*a* and forwards these requests to parallel process control server 140*d* for performance. Control server 140*c* then waits for a completion signal from parallel process control server 140*d* and provides the output results to back end server 140*b* for further processing (e.g., graphical rendering via GRE 149).

Control server 140*c* is also coupled to financial database 150*d*, investment database 150*e*, function database 150*f* and shared memory area 160*a*. Financial database 150*d* (described in more detail below) stores financial sample data relating to particular investments. Investment database 150*e* (described in more detail below) stores financial data regarding investments for which clients may be interested in performing resampled statistical analysis (i.e., stocks, mutual finds, etc.). Function database 150*f* (described in more detail below) stores function prototypes for functions to be performed on financial data.

Parallel process control server 140*d* is coupled to parallel processors 112*a*–112*e* and output data memory area 160*b*. Parallel processors 112*a*–112*e*, which are each coupled to a respective local cache 112*a*1–112*e*1 and shared memory area 160*a*, perform resampled statistical analysis of sample data stored in shared memory area 160*a* (i.e., resampled statistical computations). Parallel process control server 140*d* (described in more detail below) orchestrates and controls parallel computation processes running on parallel processors 112*a*–112*e*. In particular, parallel process control server 140*d* requests initialization of resampled statistical analysis of data stored in shared memory area 160*a* from individual processors 112*a*–112*e*. Upon completion of all parallel processes running on processors 112*a*–112*e*, parallel process control server 140*d* retrieves the results stored in local caches 112*a*1–112*e*1 and stores the aggregate data in output data area 160*b* where it can be processed further (e.g., in GRE 149).

GRE 149 performs graphical rendering (e.g., plots) of output data generated by RSAE 139. GRE 149 includes graphics rendering engine server 140*e*, which is coupled to plot database 150*b*. As described in detail below, plot database 150*b* stores data regarding the rendering and formatting of distribution plots generated by graphics rendering engine server 140e.

Back end server 140b is also coupled to client database 150g and alert rules database 150c. Client database 150g stores information related to clients that have registered with financial information site 119. Alert rules database 150c stores data pertaining to client specified rules for alerting clients to near real time behavior of investments. According to one embodiment of the present invention, clients are alerted to rule violations by e-mail via SMTP server 140f, which is also coupled to back end server 140b.

Figure 3:
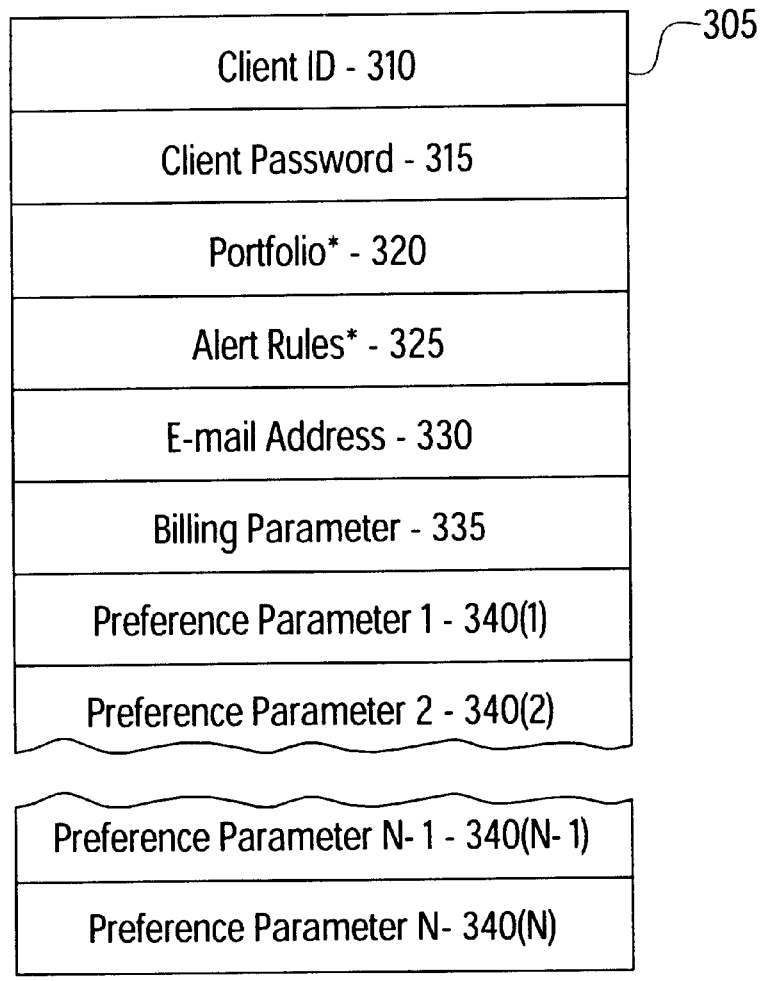
FIG. 3 depicts the structure of a client record that is stored in a client database at a financial information site according to one embodiment of the present invention.

FIG. 3 depicts the structure of a client record that is stored in a client database 150g at a financial information site 119 according to one embodiment of the present invention. Each client record 305 includes client ID field 310, client password field 315, portfolio* pointer field 320, alert rules* pointer field 325, e-mail address field 330, billing parameter field 335 and preference parameter fields 340(1)–340(N).

Client ID field 310 stores a unique 16-byte character array or pointer to a character array of a client that has registered with financial information site 119. Client password field 315 stores a unique 16-byte character array or pointer to a character array of a password associated with a client 105. Clients 105 may establish a client ID and password upon registration with financial information site 119.

Portfolio* pointer field 320 stores a pointer to a linked list of investments that a client 105 has selected for tracking using financial information site 119. According to one embodiment of the present invention, each link in the linked list stores an identifier of an investment entity as described in more detail below. Alert rules* pointer field 340 stores a linked list of alert rule record IDs (discussed in more detail below) that specify particular financial alert rules that are monitored by financial information site 119 and associated with individual clients 105. These rules are used to notify individual clients 105 of the occurrence of particular events they wish to follow based upon a resampled statistical analysis of financial data. E-mail address field 330 stores a 32-byte character array or pointer to a character array of an e-mail address of a client 105. Billing parameter field 335 stores a pointer to billing object record that includes billing information for a client 105. Preference parameters 340(1)–340(N) store preference parameters related to customization functions associated with financial information site 119.

Figure 4:
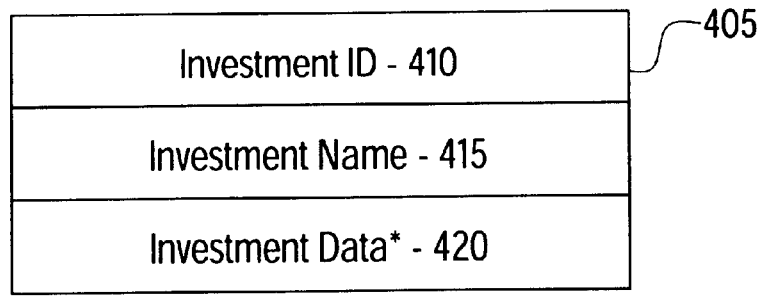
FIG. 4 depicts the structure of an investment record that is stored in an investment database at a financial information site according to one embodiment of the present invention.

FIG. 4 depicts the structure of an investment record that is stored in an investment database 150e at a financial information site 119 according to one embodiment of the present invention. Investments may represent stocks, mutual funds, etc. Each investment record 405 includes investment ID field 410, investment name field 415 and investment data pointer 420. Investment ID field 410 stores a unique 32-bit value corresponding to a particular investment. Investment name field 415 stores a 16-byte character array of a name of an investment. Investment data pointer 420 stores a pointer to a linked list of financial data records related to an investment, which are stored in financial database 150d (described in more detail below).

Figure 5A:
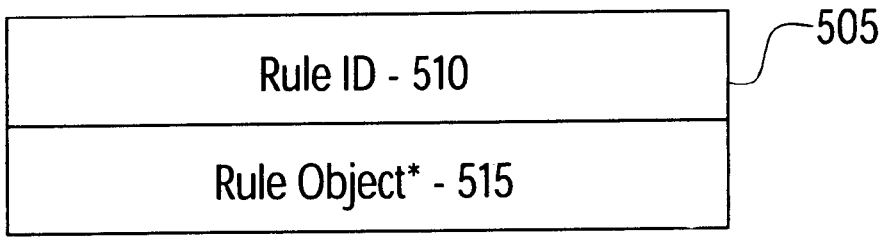
FIG. 5a depicts the structure of an alert rule record that is stored in an alert rules database at a financial information site according to one embodiment of the present invention.

FIG. 5a depicts the structure of an alert rule record that is stored in an alert rules database 150c at a financial information site 119 according to one embodiment of the present invention. According to one embodiment of the present invention, each alert rule specifies a percentile constraint of a resampled distribution for which a client 105 desires notification. Clients 105 of financial information site 119 may desire to be notified if the occurrence of a current event is extremely unlikely. As described in detail below, financial information site 119 executes a process to notify clients if a threshold percentile of a resampled statistical distribution is either below or above a current value of a financial event, indicating that the event is unlikely. For example, a client 105 may desire to be alerted if the gross rate of returns for a specified investment over a 200-day period assumes an improbable value. In this case, each day (or at a frequency specified by a client 105), financial information site 119 calculates the actual gross rate of returns for the investment over the last 200 days. Then, financial information site 119 executes a resampled statistical process to evaluate the gross rate of returns for 200-day periods described in detail below) to determine whether a percentile value of the distribution is above or below the current value. If so, the current value is highly unlikely and the client 105 is notified via e-mail.

Each alert rule record 505 includes rule ID field 510 and rule function object* pointer field 515. Rule ID field 510 stores a unique 32-bit integer value pertaining to an alert rule, which is used for identification purposes. Rule function object pointer field 515 stores a reference to a rule object (described with reference to FIG. 5b) relating to the occurrence of a financial event for which a client desires notification.

Figure 5B:
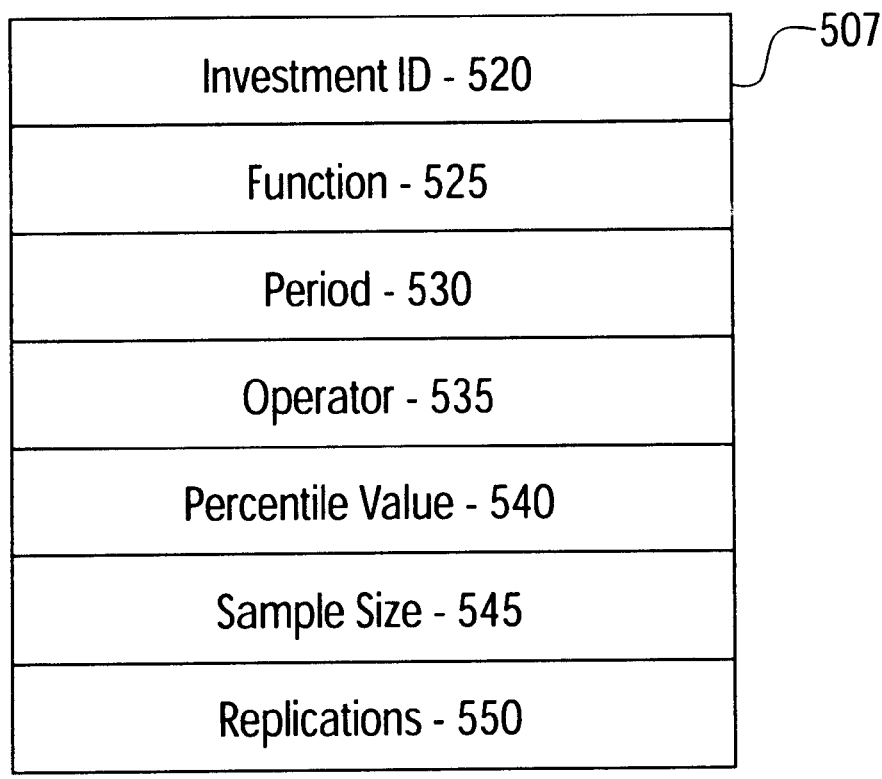
FIG. 5b depicts the structure of a rule object record according to one embodiment of the present invention.

FIG. 5b depicts the structure of an alert rule object according to one embodiment of the present invention. Each rule alert rule record 507 includes investment ID field 520, function field 525, periods field 530, operator field 535, percentile value field 540, sample size field 545 and replications field 550. Investment ID field stores a 32-bit integer value identifying an investment, as described below with respect to FIG. 6a. Function field 525 stores a 32-bit function ID of a function record as described below with respect to FIG. 7. Periods field 530 stores a number of periods (i.e., days) for which the client 105 desires to evaluate the investment. Operator field 535 stores a 4-bit field indicating an operator such as '<' or'>.' Percentile value field 540 stores an integer representing a percentile value. Sample size field 545 stores a 32-bit integer value representing a sample size for which to conduct a resampled statistical analysis. Replications field 550 stores a 32-bit integer value representing a number of replications to perform in conducting a resampled statistical process.

Figure 6A:
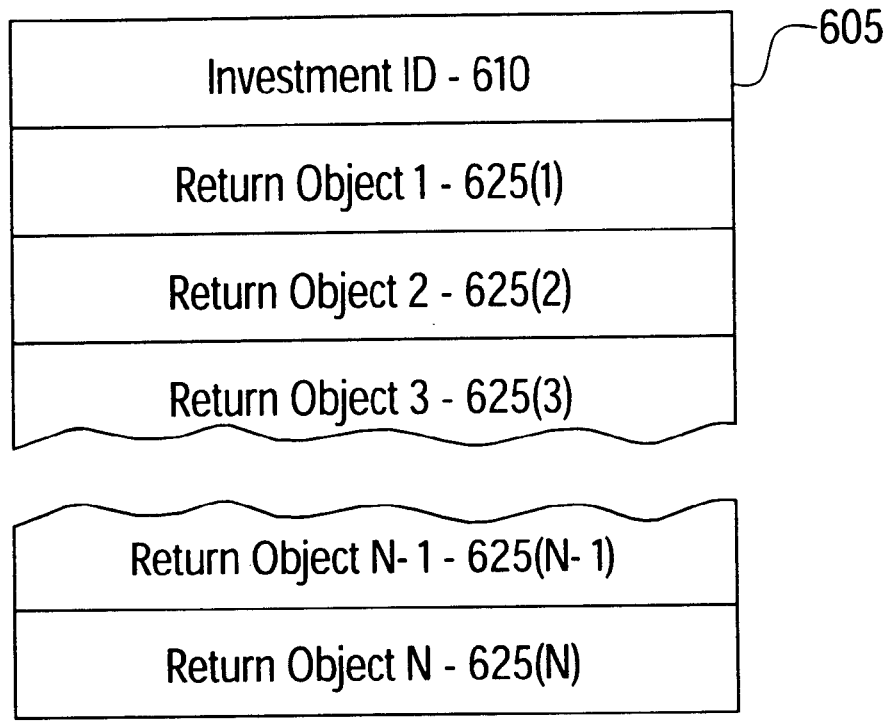
FIG. 6a depicts a data structure for storing financial data in a financial database according to one embodiment of the present invention.

As described in detail below, the resampled process is conducted based upon parameters stored in fields 520, 525, 530, 545 and 550. Based upon operator filed 535, it is then determined whether the distribution results for a resampled statistical process above or below the current value exceed the percentile value stored in percentile value field 540. If so, the client is notified FIG. 6a depicts a data structure for storing financial data in a financial database according to one embodiment of the present invention. Each financial data record 605 includes investment ID field 610, and one or more return objects 625(1)–625(N). Investment ID field 610 stores a 32-bit integer value uniquely identifying a financial record. Return objects 625 (as described in FIG. 6b) store actual data values of returns associated with the investment represented by investment ID field 610.

Figure 6B:
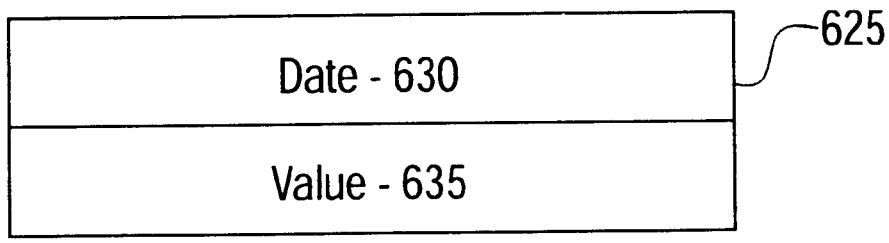
FIG. 6b depicts a data structure for storing a financial return according to one embodiment of the present invention.

FIG. 6b depicts a data structure for storing a return object according to one embodiment of the present invention. Each return object 625 includes a date field 630 and a value field 635. Date field 630 stores a data object corresponding to the data of a return and value field 635 stores the value (dollar amount or otherwise) of the investment on the date stored in date field 630.

Figure 7:
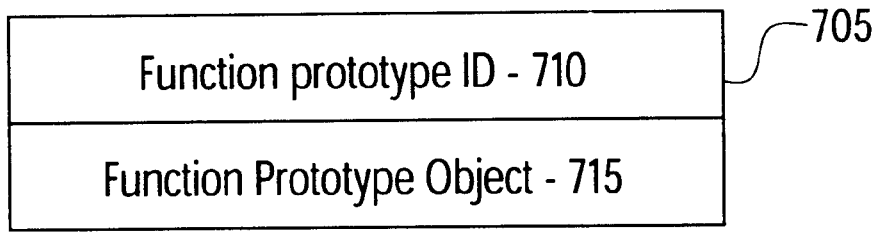
FIG. 7 depicts a data structure for storing a function prototype in a function database at a financial information site according to one embodiment of the present invention.

FIG. 7 depicts a data structure for storing data in a function database 150f at a financial information site 119 according to one embodiment of the present invention. Function database 150f stores various function prototypes for functions to be performed on investment data, which are used in performing resampled statistical analysis of financial data. For example, according to one embodiment function database 150f stores function prototypes for gross rate of return, maximum drawdown and/or a monitor function. Each function record 705 includes function prototype ID 710 and function prototype object 715. Function prototype ID field 710 stores a unique 32-bit integer value pertaining to a function prototype, which is used for identification purposes. Function prototype object field 715 stores a 1024-byte character array of a function prototype. The syntax for representing a function prototype stored in function prototype object field 715 is variable. Practitioners skilled in the art will recognize that many data structures and techniques may be utilized to represent function prototypes. According to one embodiment of the present invention, a maximum drawdown function prototype is stored in function database 150 based upon the following equation: For a set of returns $(r_1–r_n)$:

$$\text{Max. Drawdown} = 1 - \text{Min}\begin{pmatrix} \frac{1+r_1}{1} & \frac{(1+r_1)(1+r_2)}{1} & \frac{(1+r_1)(1+r_2)(1+r_3)}{1} & \cdots & \frac{(1+r_1)(1+r_2)(1+r_3)\ldots(1+r_n)}{1} \\ 0 & \frac{(1+r_1)(1+r_2)}{(1+r_1)} & \frac{(1+r_1)(1+r_2)(1+r_3)}{(1+r_1)} & \cdots & \frac{(1+r_1)(1+r_2)(1+r_3)\ldots(1+r_n)}{(1+r_1)} \\ 0 & 0 & \frac{(1+r_1)(1+r_2)(1+r_3)}{(1+r_1)(1+r_2)} & \cdots & \frac{(1+r_1)(1+r_2)(1+r_3)\ldots(1+r_n)}{(1+r_1)(1+r_2)} \\ \vdots & \vdots & \vdots & \cdots & \vdots \\ 0 & 0 & 0 & \cdots & \frac{(1+r_1)(1+r_2)(1+r_3)\ldots(1+r_n)}{(1+r_1)(1+r_2)(1+r_3)\ldots(1+r_{n-1})} \end{pmatrix}$$

According to one embodiment of the present invention, a gross rate of returns function prototype is stored in function database 150f based upon the follow equation: For a set of returns $(r_1–rn)$:

$$\text{Gross Rate of Return} = \left[\prod_i (1+r_i)\right] - 1$$

According to one embodiment of the present invention, a monitor function calculates a number of 'up' or 'down' days for a given investment over a certain period. Thus, the following equation describes a monitor function:

$$\sum_i^N \delta(r_i = \text{up})$$

Thus, for example, according to one embodiment, the maximum drawdown function, the gross rate of return function (as described above) and the monitor function are coded according to a predefined syntax and stored as a function prototype in function database 150f.

Figure 8:
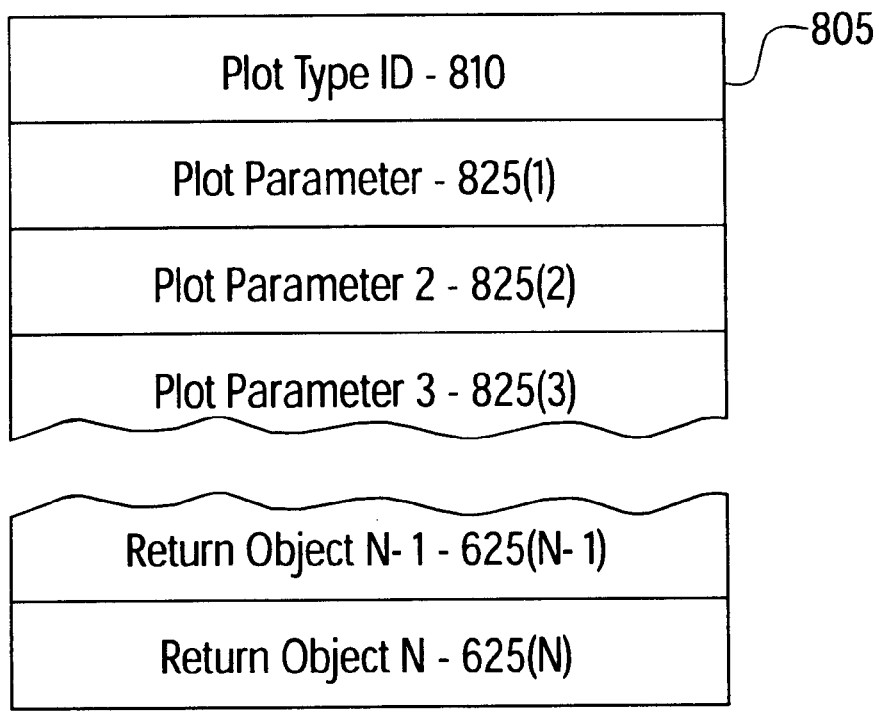
FIG. 8 depicts a data structure for storing plot information in a plot database at a financial information site according to one embodiment of the present invention.

FIG. 8 depicts a data structure for storing plot information in a plot database at a financial information site according to one embodiment of the present invention. Each plot type record 805 stores plot type ID field 810 and one or more plot parameter fields 825(1)–825(N). Plot ID field stores a unique 32-bit integer identifying a particular plot type. Plot parameter fields 825(1)–825(N) store various parameters relating to formatting of plots.

Figure 9A:
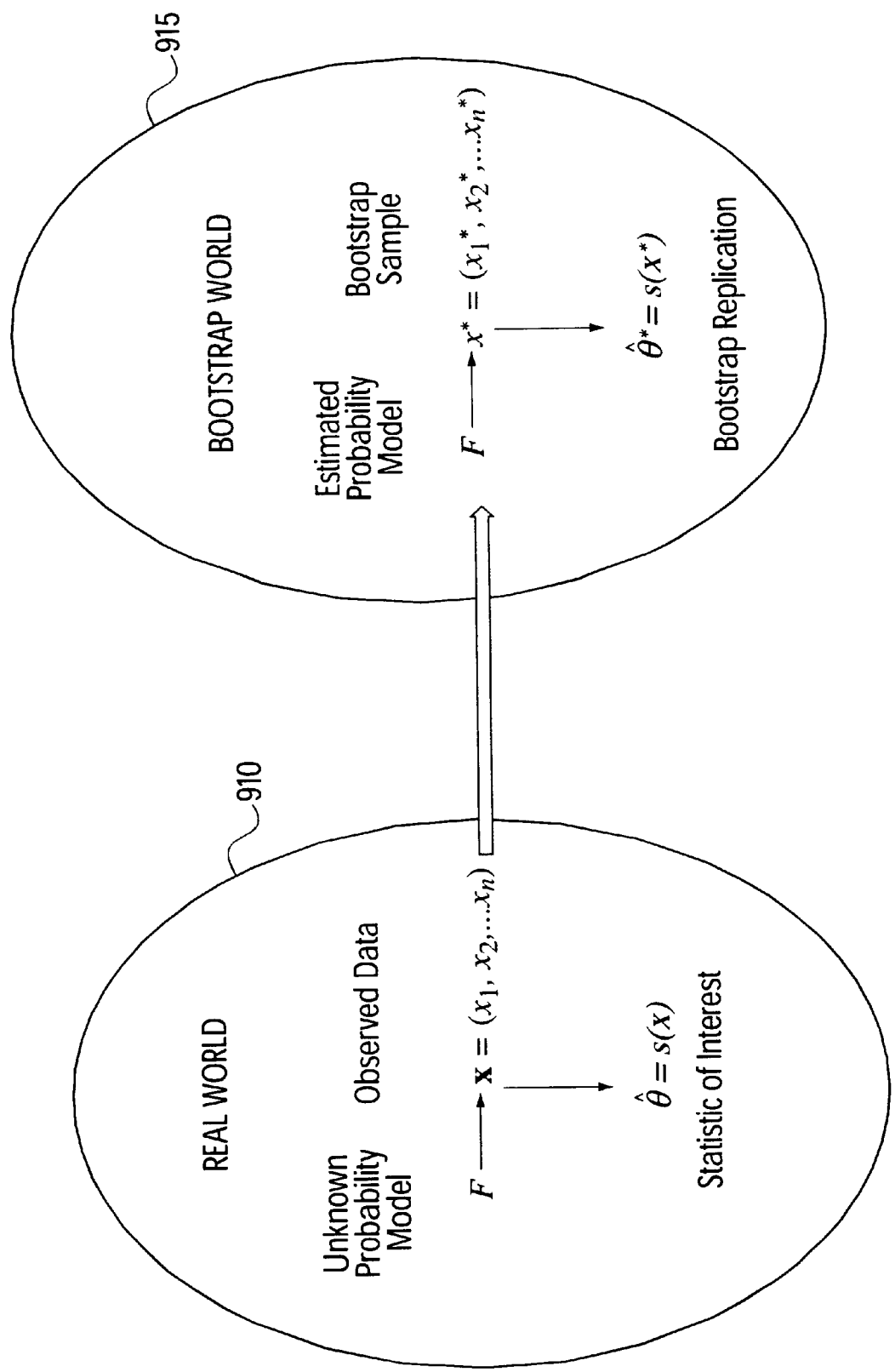
FIG. 9a (reprinted from Efron and Tibshirani) depicts the underlying theory of the bootstrap method.

FIG. 9a (reprinted from Efron and Tibshirani) depicts the underlying theory of the bootstrap method. Ideally statistical inferences are based on a known probability distribution F. A parameter is a function of a known probability distribution F.

$$\theta = t(F)$$

Furthermore, generally financial data may not be modeled parametrically because it is heavy tailed (i.e., non-Gaussian) and therefore, F is not known or ascertainable. For example, with respect to financial data, an investor may desire to study a specific parameter of a financial investment such as the gross rate of return of a stock over a certain period of time that is dependent upon knowledge of the true probability distribution function for the investment. However, generally neither the PDF for an investment, nor the PDF for a parameter such as the gross rate of return over a specified time period for the investment (which is dependent upon the underlying PDF) is known.

Resampled statistical methods such as the bootstrap attempt to estimate the PDF of an unknown distribution using sampled data. Typically, sample data is available for an investment that is dependent upon an unknown PDF F.

$$F \to x = (x_1, x_2, \ldots x_n)$$

The empirical distribution function $\hat{F}$ is defined to be the discrete distribution that puts probability 1/n on each value $x_i$, $i=1,2,\ldots n$. $\hat{F}$ assigns to a set A in the sample space of x its empirical probability $\text{Prob}\{A\} = \#\{x_i \epsilon A\}/n$, In, the proportion of the observed sample $x=(x_{1,2}, \ldots, x_n)$.

The plug-in principle is a method of estimating parameters from samples. The plug-in estimate of a parameter $\theta = t(F)$ is defined to be $\hat{\theta} = t(\hat{F})$ 910. These statistics are referred to as summary statistics, estimates or estimators. Resampled statistical methods attempt to determine the distribution of $\hat{\theta}$, an estimator of $\theta$, derived from a sample x.

Bootstrap methods depend on the notion of a bootstrap sample. If $\hat{F}$ is an empirical distribution with probability of 1/n for each of the observed values $x_i$, $i=1,2,\ldots n$, a bootstrap sample is defined to be a random sample of size n drawn from $\hat{F}$, $x^* = (x_1^*, x_2^*, \ldots, x_n^*)$, where $\hat{F} \to (x_1^*, x_2^*, \ldots, x_n^*)$. The star notion indicates that $x^*$ is not the actual data set x, but rather a randomized, or resampled version of x. The bootstrap data points $x_1^*, x_2^*, \ldots, x_n^*$ are a random sample of size n drawn with replacement from the population of n objects $(x_1, x_2, \ldots, x_n)$. Corresponding to a bootstrap data set $x^*$ is a bootstrap replication of $\hat{\theta}$, $\hat{\theta}^* = s(x^*)$ 915. The quantity $s(x^*)$ is the result of applying the same function $s(\cdot)$ to $x^*$ as was applied to x (i.e., the statistical function of interest). For example, $s(\cdot)$ may be the gross rate of return of an investment over a specific period of time.

Thus the bootstrap attempts to estimate a parameter of interest θ=t(F) from an unknown distribution F using a random sample $x=(x_1,x_2,\ldots,x_n)$. Given a random sample $x=(x_1,x_2,\ldots,x_n)$ and a statistic θ̂=s(x,F) that depends on the sample and possibly the underlying distribution F, the distribution of θ̂, $$\zeta_F(\hat{\theta}=s(x,F))$$

is estimated by that of $$\zeta_{\hat{F}}(\hat{\theta}^*=s(x^*,\hat{F}))$$

Figure 9B:
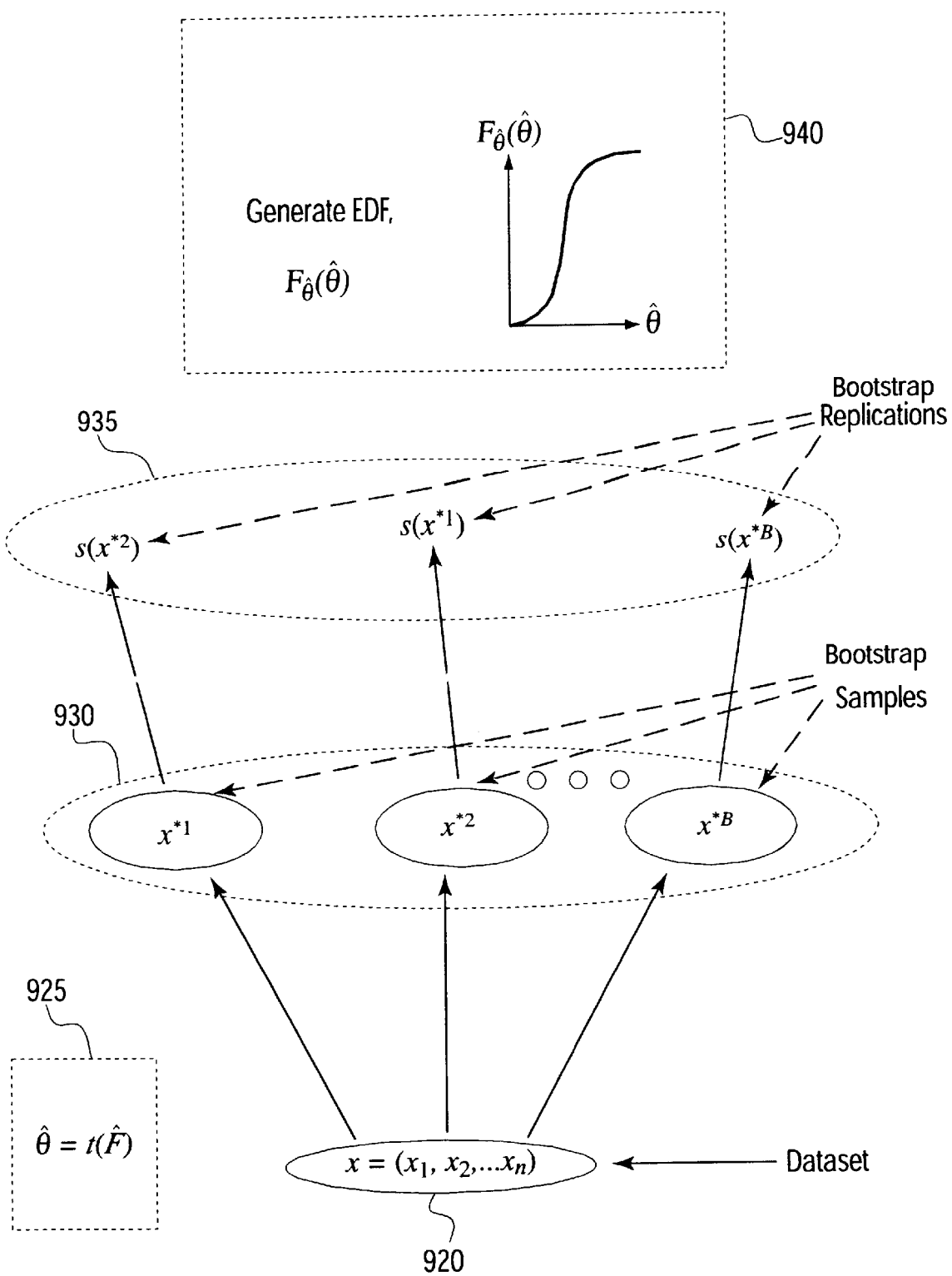
FIG. 9b depicts a procedure for performing a bootstrap method to generate a distribution of bootstrap replications according to one embodiment of the present invention.

FIG. 9b depicts a process for performing a bootstrap method (a resampled statistical method) to generate a distribution of bootstrap replications according to one embodiment of the present invention. In step 920, a sample space x is selected. In step 925, a statistical function based on the sample space data is computed θ̂=t(F̂). In step 930, bootstrap samples $x^*=(x_1^*,x_2^*,\ldots,x_n^*)$, are generated from the sample space using a resampling process. In step 935, a bootstrap replication θ̂=s(x*) is computed for each bootstrap sample using a desired function. In step 940, a plot of the distribution of bootstrap replications $(s(x^{*1}),s(x^{*2})\ldots s(x^{*B}))$ is generated in order to estimate the distribution of θ̂.

Figure 10:
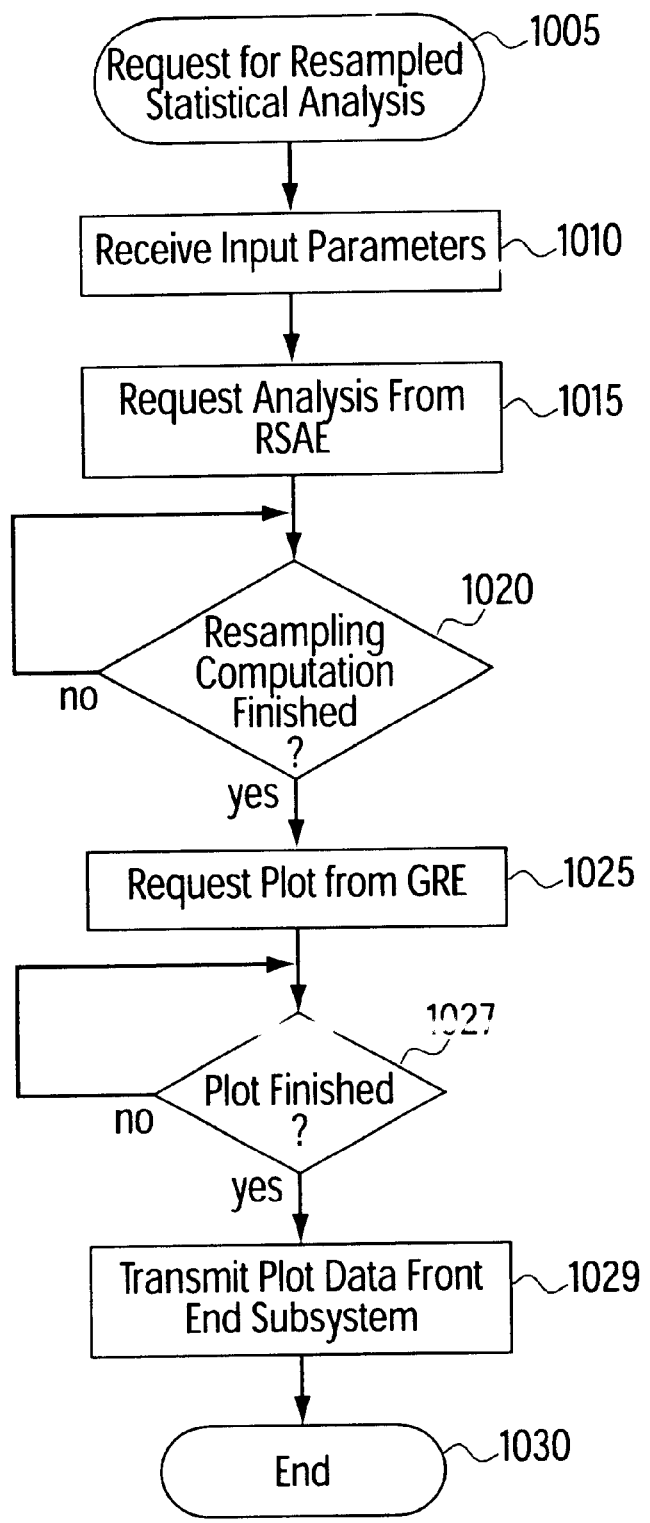
FIG. 10 is a flowchart of steps for performing a resampled analysis of an investment and generating a graphical output according to one embodiment of the present invention.

FIG. 10 is a flowchart of steps for initializing a resampled statistical analysis of financial data at a financial information site 119 according to one embodiment of the present invention. In step 1005, the process is initiated upon receipt of a request for a resampled statistical analysis of financial data, which is received via front end subsystem 129 (e.g., via an HTML form). In step 1010, input parameters relating to a resampled statistical analysis are received via client/gateway server 140a and transmitted to back end server 140b. According to one embodiment, the following parameters are solicited from a client 105: investment;

function;

periods (Q);

bias;

sample_size;

replications; and plot_type.

The 'investment' parameter specifies an identifier of an investment (i.e., 410) stored in investment database 150e. The 'function' parameter specifies a function prototype identifier (i.e., 710) stored in function database 150f. For example, according to one embodiment, the function prototype may correspond to a function for maximum drawdown, gross rate of return or a monitor function as described above. The 'periods' parameter specifies a number of periods for which a client 105 desires to evaluate an investment. For example, a client 105 may desire to perform a resampled statistical analysis for the gross rate of returns of an investment over a 253-day period. The 'bias' parameter is a decimal value that is either −1 or between 0 and 1 that specifies the degree of randomness in the resampling process. A value of −1 indicates that the resampling process should be conducted purely randomly. As described in more detail below, if the 'bias' parameter is between 0 and 1, sampling is performed so that b% of the samples are 'up' days and 1−b% of the samples are 'down' 'days, where b=bias. Thus, if b=1, only 'up' days will be selected and if b=0 only 'down' days are selected. The 'sample_size' parameter specifies a number of samples to use in the resampling process (the size of the x). The 'replications' parameter specifies a number of bootstrap samples to be used in the resampling process. The 'plot_type' parameter specifies a plot type identifier (i.e., 810) pertaining to formatting parameters to be used in generating a plot of distribution results.

In step 1015, back end server 140b requests the initiation of a resampled statistical analysis process at RSAE 139. In particular, according to one embodiment of the present invention, back end server 140b transmits the following vector to control server 140c at RSAE 139:

request_resampling process (investment, function, periods (Q), bias, sample_size, replications, plot_type)

Back end server 140b then waits for completion of the resampled statistical analysis task. In step 1020, back end server 140b determines whether RSAE 139 has completed the resampling process. According to one embodiment, upon completion of the resampling process, control server 140c transmits a completion signal to back end server 140b and an address in output data area 160b where output data of a resampled statistical process is stored. If the resampling process is not completed ('no' branch of step 1020), back end server 140b continues to wait for notification. If the resampling method is completed ('yes' branch of step 1020), in step 1025, back end processor 140b requests a graphics plot from GRE 129. In particular, according to one embodiment, back end processor 140b transmits the following vector to graphics rendering server 140e at GRE 149:

plot(OutAddr, plot_type, plot_parameters).

OutAddr specifies an address in output data area, which stores results of a resampled statistical process previously conducted by RSAE 139, plot_type specifies a plot type requested by a client 105 and plot_parameters specifies additional plotting parameters that may be required by GRE 129. Back end server 140b then waits for completion of the plot. In step 1027, back end processor 140b determines whether graphics rendering server 140e has completed the requested plot (i.e., whether graphics server has transmitted a completion signal to back end processor). According to one embodiment, upon completion of a plot, graphics rendering server 140e transmits a completion signal to back end processor 140b. Graphics rendering server 140e also transmits results of the plotting process in the form of plot data, which may be used to dynamically create an HTML page for transmission to a client 105. If the plot is not finished ('no' branch of step 1027), back end processor 140b continues to wait for the completion signal. If the plot has been completed ('yes' branch of step 1027) in step 1029 and back end processor 140b transmits the plot data results (e.g., HTML page) to client/gateway server 140a for transmission to client 105. The process ends in step 1030.

Figure 11:
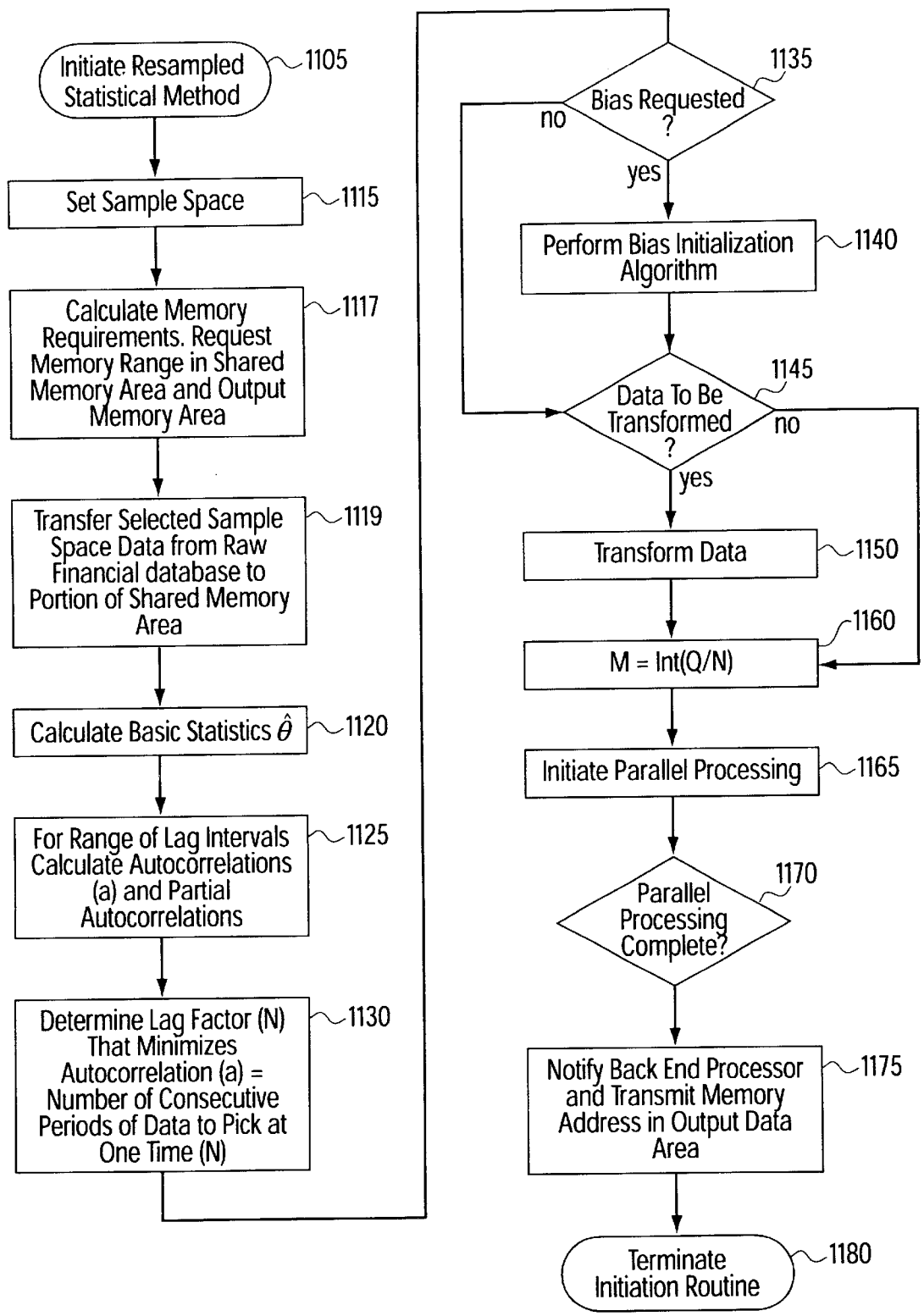
FIG. 11 is a flowchart that depicts a set of steps to initiate a resampled statistical analysis of financial data using a parallel processing architecture according to one embodiment of the present invention.

FIG. 11 is a flowchart that depicts a set of preparation steps performed by a control server 140c at a financial information site 119 to initialize a resampled statistical analysis of financial data using a parallel processing. In step 1105, the process is initiated upon the receipt of a request_resampling_process vector from back end server 140b as described above with reference to FIG. 10.

In steps 1115–1119, control server 140c reserves appropriate memory in shared memory area 160a and output data area 160b and stores appropriate sample data for processing in shared memory area 160a. In particular, in step 1115, a sample space is determined using the sample_size parameter received in step 1105. Because financial database 150d may store samples for investments for many different time periods, in step 1115, a set of relevant samples for the resampled statistical analysis requested by the client 105 is determined. In step 1117, based upon the sample_size parameter, control server 140c determines an amount of memory required for storage of samples in shared memory area 160*a* and allocates an appropriate memory block in shared memory area 160*a* for storage of the samples. Further, based upon the replications parameter, server 140*c* also determines an amount of memory to reserve in output data memory area 160*b* for storage of results of the resampling process. In step 1119, based upon the sample_size parameter, server 140*c* retrieves financial data samples from financial database 150*d* and stores these samples in shared memory area 160*a* in the memory block previously reserved in step 1117. In step 1120, process server 140*c* computes θ from the sample data stored in shared memory area 160*a*. In particular, a statistical function such as the mean, median or standard distribution is calculated by dividing the sample space into appropriate length periods.

In steps 1125–1160, control server 140*c* executes a series of steps to format and prepare the data for processing. Specifically, in step 1125, autocorrelation of the sample space data stored in shared memory area 160*a* is analyzed. Specifically, control server 140*c* executes a process to calculate the autocorrelation and partial autocorrelation functions on the data stored in shared memory area 160*a* for a number of different lag periods (a) and stores the results in temporary storage. According to one embodiment, the following equations are utilized to calculate the autocorrelation and partial autocorrelation functions for the data stored in shared memory area 160*a*:

$\forall a<n$ and $1 \leq x < a$:
Samples in the sample space are defined as:
$r=(r_1, r_2, \ldots, r_n)$
Shifted versions of the sample space are defined:
$Z_1 \equiv (r_1, r_2, \ldots, r_{n-a})$
$Z_2 \equiv (r_{a+1}, r_2, \ldots, r_n)$
$Z_x \equiv (r_{a+1-x}, \ldots, r_{n-x})$
The autocorrelation function is defined as:

$$ACF(a) = \frac{S(a)_{Z_1 Z_2}}{S(a)_{Z_1} S(a)_{Z_2}}$$

The partial autocorrelation function is defined as:

$$PACF(x, a) = \frac{S(a)_{Z_1 Z_2} - S(a)_{Z_2 Z_x} S(a)_{Z_1 Z_x}}{\sqrt{1 - (S(a)_{Z_2 Z_x})^2} \sqrt{1 - (S(a)_{Z_1 Z_x})^2}}$$

The following are intermediate calculations:

$$S(a)_{Z_1 Z_2} = \frac{(Z_{1_i} - \overline{Z_1})(Z_{2_i} - \overline{Z_2})}{n - a - 1}$$

$$S(a)_{Z_1} = \sqrt{\frac{\sum_{i=1}^{n-a}(Z_{1_i} - \overline{Z_1})^2}{n - a - 1}}$$

$$S(a)_{Z_2} = \sqrt{\frac{\sum_{i=a+1}^{n}(Z_{2_i} - \overline{Z_2})^2}{n - a - 1}}$$

$$\overline{Z_{1_i}} = \sum_{i=1}^{n-a} \frac{Z_{2_i}}{n - a}$$

$$\overline{Z_{2_i}} = \sum_{i=a+1}^{n} \frac{Z_{2_i}}{n - a}$$

In step 1130, the autocorrelation and partial autocorrelation data calculated is analyzed to determine a minimum lag factor (N) that minimizes the autocorrelation (a). The minimum lag factor (a) corresponds to the number of consecutive periods that are selected at one time during the resampling process.

In step 1135, the bias parameter received in step 1105 is analyzed. If no bias is selected (i.e., bias=−1 and data is to be selected randomly), control passes to step 1045 ('no' branch of step 1035). If bias<>0, in step 1040, a bias initialization algorithm is performed as described in detail below. In step 1145, it is determined whether the sample space data should be transformed. This determination is based upon the precise function requested by the client 105 (i.e., specified by function parameter). For example, if the function is gross rate of return over a specified period, no transformation step is required. However, if for example, the function type is the monitor type, the sample data is transformed to represent the sign of the returns only (i.e., −1 and +1). Other variations will exist depending upon the type of functions implemented. If no transformation is necessary ('no' branch of step 1145), control is transferred to step 1160. Otherwise ('yes' branch of step 1045) in step 1150, the data is transformed and restored in shared memory area 160*b* in step 1150.

In step 1160, the variable M=Int(Q/N) is determined. The variable 'M' specifies the number of samples to select for each resampling. In step 1165, server 140*c* executes a request for parallel processing of data stored in shared memory area 160*a* by transmitting a vector to parallel processing control server 140*d* using the prototype: Request_Parallel_Process(input_addr, input_range, output_addr, output_range, M, N function, bias, replications). The parameters 'input_addr', 'input_range', 'output_addr' and 'output_range' correspond respectively to the start address and range in shared memory area 160*a* and output memory area 160*b* that were determined in step 1117. The parameters M and N correspond to the variables determined in steps 1130 and 1160 respectively. The parameters 'bias' and 'replications' correspond to the same parameters received in step 1105.

In step 1170, control server 140*c* determines whether it has received a signal from parallel process control server 140*d* indicating the completion of parallel processing. If not ('no' branch of step 1070), control server 140*c* continues to wait for the completion signal. If a completion signal has been received ('yes' branch of step 1170), in step 1175, control server 140*c* transmits a completion signal to back end server 140*b* along with a memory address in output data area 160*b* where the output data for the resampled method is stored.

Figure 12:
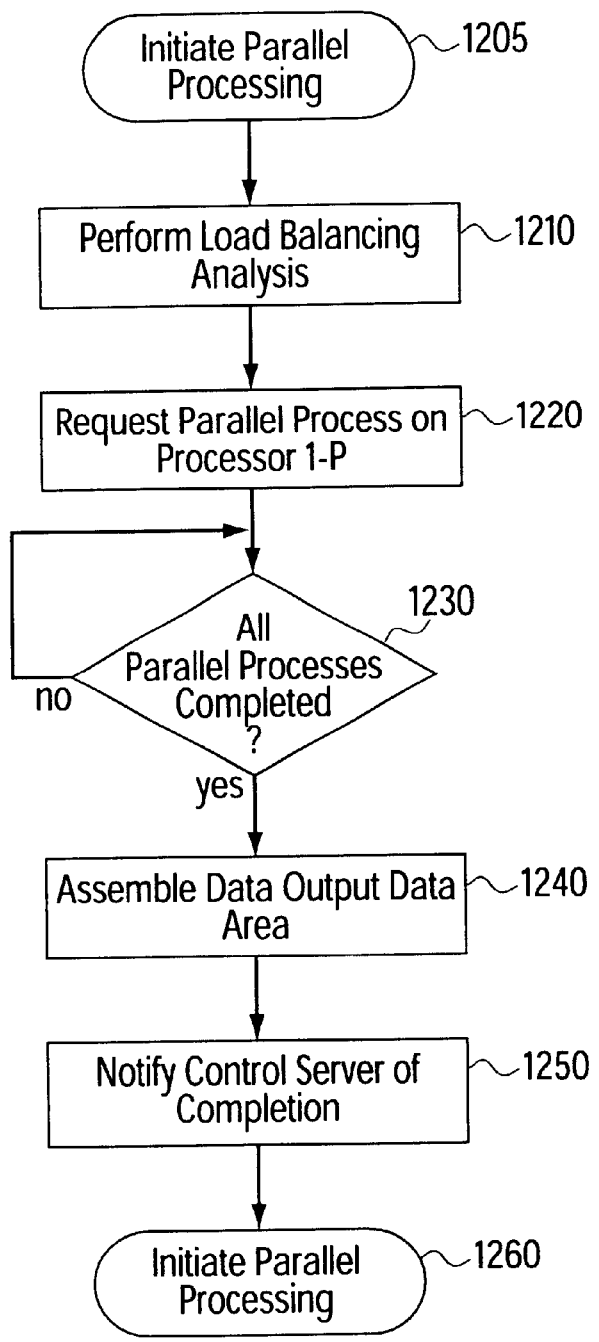
FIG. 12 is a flowchart of a parallel processing control process according to one embodiment of the present invention.

FIG. 12 is a flowchart of a parallel processing control process according to one embodiment of the present invention. Although only 5 parallel processors (112*a*–112*e*) are depicted in FIG. 1, this number is arbitrary and any number P of parallel processors may be used to perform the resampling technique. Furthermore, although the method described herein utilizes a parallel processing architecture, the present invention does not require a parallel processing scheme. According to one embodiment of the present invention, the process depicted in FIG. 12 is implemented by parallel process control server 140*d* at financial information site 119.

In step 1205, parallel process control server 140*d* receives a vector requesting a parallel process as described in step 1165. In step 1210, parallel process control server 140*d* performs a load balancing step. In step 1220, parallel process control server 140*d* requests the initiation of processes on individual parallel processors 112*a*–112*e* by transmitting a begin_process vector to each respective parallel processor 112*a*–112*e*. According to one embodiment of the present invention the vector is transmitted to each processor 112*a*–112*e* to initiate parallel processing: begin_process (input_addr, input_range, M, N, function, bias, replications/P). The parameters 'input_addr', 'input_range', correspond respectively to the start address and range in shared memory area 160*a* that were received in step 1205. The parameters 'periods', 'bias'and 'replications', 'M' and 'N' correspond to the same parameters received in step 1205. P specifies the number of parallel processors. Thus, each parallel processor computes replications/P replications.

In step 1230, parallel process control server 140*d* checks to determine whether all parallel processors 112*a*–112*e* have completed processing. Upon completion of a processing task, each parallel processor executes a step of notifying control server 140*c* of completion. In particular, according to one embodiment, upon completion each parallel processor 112 sends parallel process control server a notification message defining a memory block where output results have been stored on the respective local cache 112*a*1–112*e*1. If notifications have not been received from all processors 112*a*–112*e*, parallel process control server 140*c* continues waiting ('no' branch of step 1120). Upon receipt of all completion notifications ('yes' branch of step 1230), parallel process control server 140*d* retrieves the data output for each parallel processor stored on local cache 112*a*1–112*a*5.

In step 1240, parallel process control server assembles all output data from each respective local cache 112*a*1–112*e*1 in output data area 160*b*. In step 1250, parallel process control server 140*d* notifies server control 140*c* that the parallel processing is completed. The process ends in step 1260.

Figure 13:
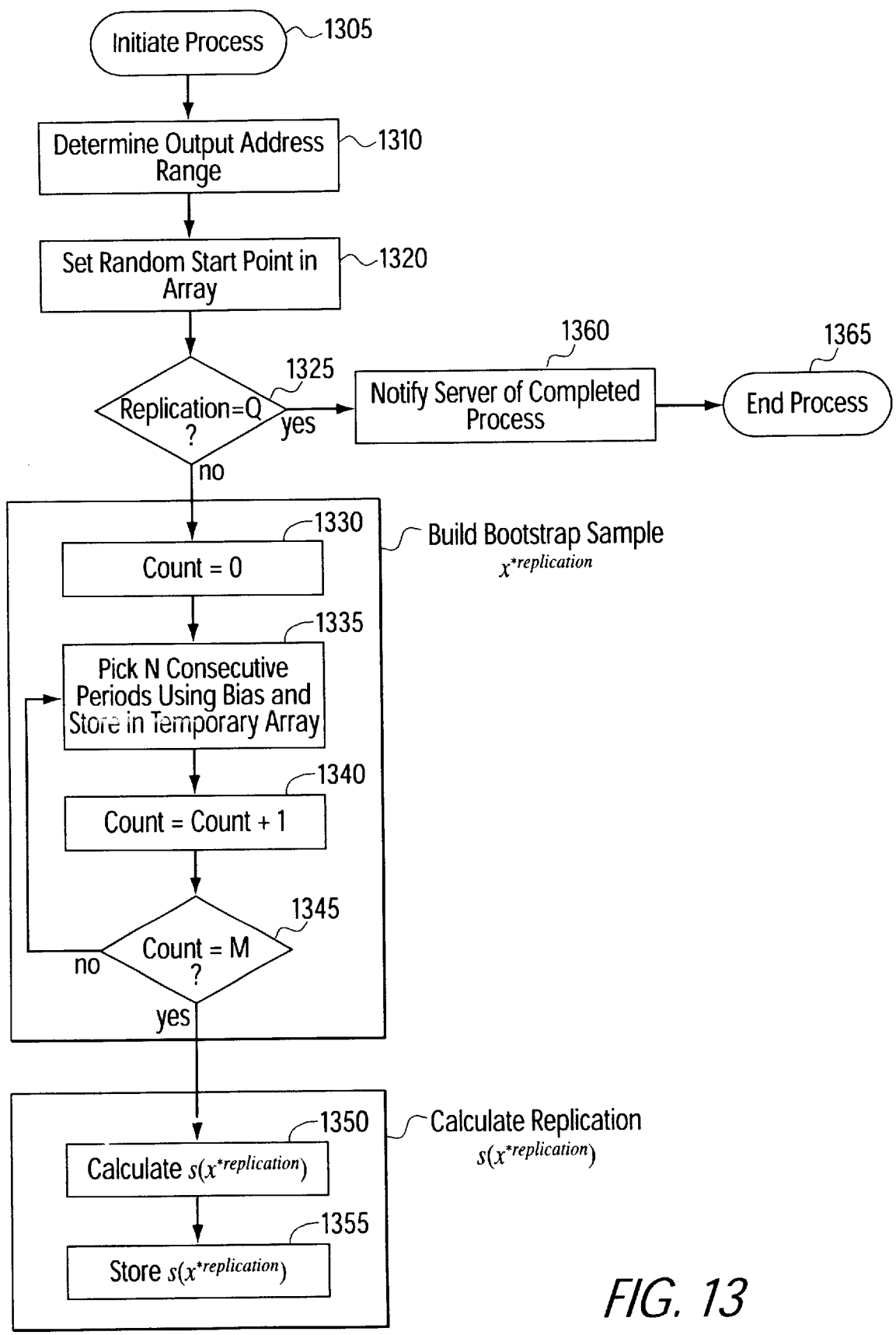
FIG. 13 is a flowchart of a set of steps for performing a resampled statistical analysis according to one embodiment of the present invention.

FIG. 13 is a flowchart of set of steps for performing a resampled statistical method according to one embodiment of the present invention. The steps shown in FIG. 13 are executed on each parallel processor 112*a*–112*e* upon the request for a parallel process by server 140*d*. In step 1305, the process is initiated and each parallel processor receives a begin_process vector as described above with reference to step 1220 of FIG. 12. In step 1310 each respective processor 112*a*–112*e* determines a range of output memory in local cache 112*a*1–112*e*1 for storage of output results. In step 1320, the parallel processor 112 determines a random start location in shared memory area 160*a* to begin sampling. In step 1325, it is determined whether all replications (Q) have been completed. If not ('no' branch of step 1325) processing continues with steps 1330–1345. Steps 1330–1345 correspond to the selection of a bootstrap sample $x^{*Replication}$. In step 1330, a temporary variable 'Count' is set to zero. In step 1335, N consecutive periods of sample points are selected from shared memory area. The degree of randomness in selection is determined by the variable 'bias'. If bias=−1, the beginning of each consecutive period is selected purely randomly. If the 'bias' parameter is set to any value other than −1, sampling is performed so that bias percent of the samples are "up" days for the investment and 1-bias percent of the samples are "down" days for the investment as described in detail below. Thus, if bias=1, only "up" days will be selected. In step 1340, the temporary 'Count' variable is increment. A biasing process is described in detail below with reference to FIG. 14. In step 1345, it is determined whether Count=M. If not ('no' branch of step 1345), flow continues with step 1335 (i.e., another N consecutive periods are selected). If so ('yes' branch of step 1345), flow continues with step 1350, and a bootstrap replication $s(x^{*eplication})$ is computed corresponding to the function s(.)

received in step 1305. In step 1355, the bootstrap replication $s(x^{*replication})$ is stored in local cache (e.g., 120*a*1). Flow continues with step 1325. When all replications have been completed ('yes' branch of step 1325), in step 1360, the parallel processor 112 notifies parallel process control server 140*d* that processing has been completed and also notifies parallel process control server 140*d* of the memory block in local cache (i.e., 112*a*–112*e*1) where the output data is stored.

Figure 14:
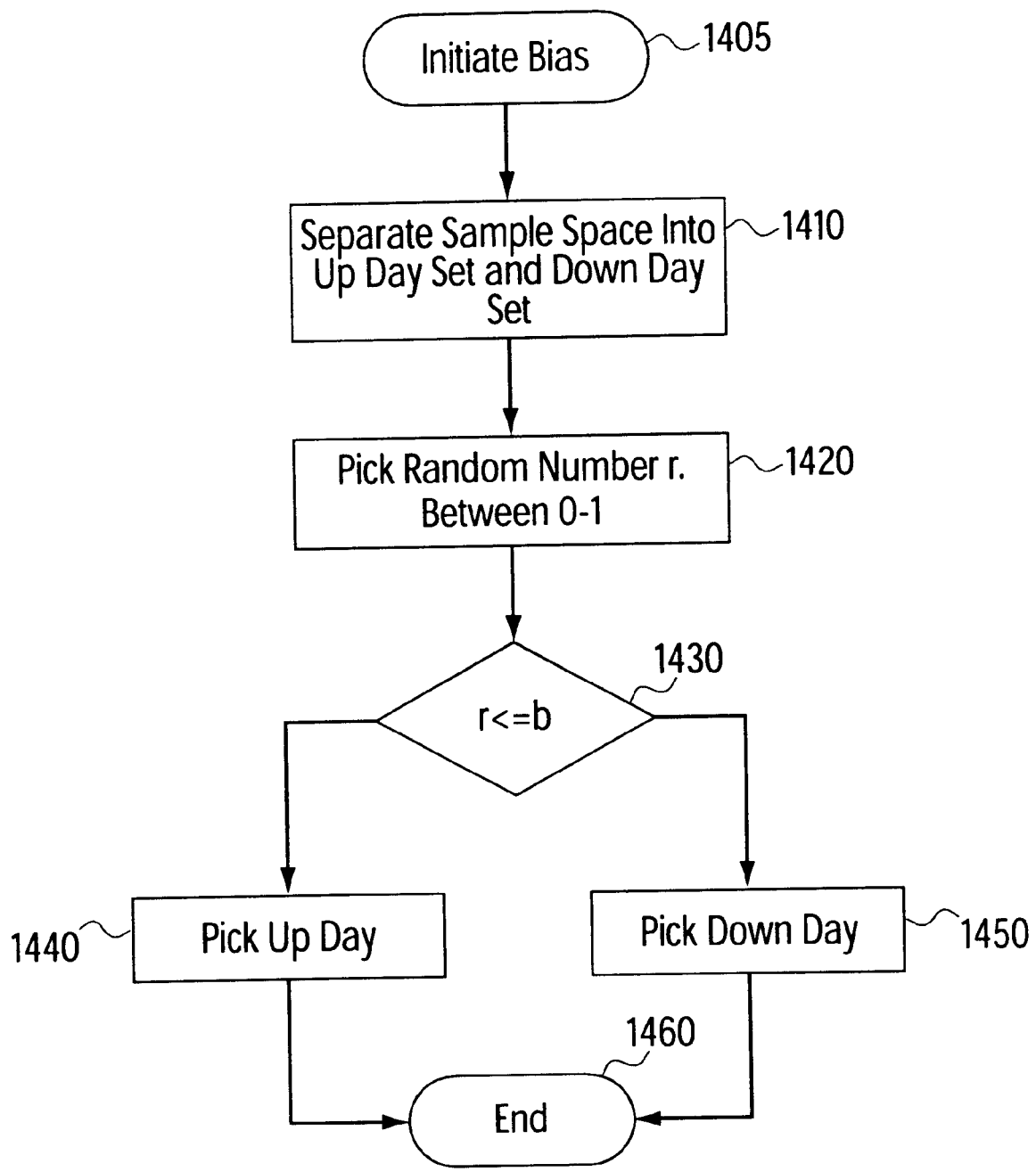
FIG. 14 is a flowchart of a set of steps for performing a biasing procedure according to one embodiment of the present invention.

FIG. 14 is a flowchart of a set of steps for conducting a bias algorithm according to one embodiment of the present invention. The process is initiated in step 1405. In step 1410, the sample space is separated into two sets, a first set including only 'up' days and a second set including only 'down' days. In step, 1420 *a* random number r, between 0 and 1 is selected. In step 1430, it is determined whether the random number r<=b (the bias parameter specified by the client). If so ('yes' branch of step 1430), in step 1440, an up day is selected. If nor ('no' branch of step 1440), in step 1450, *a* down day is selected. The process ends in step 1460. The process depicted in FIG. 14 is repeated for each bootstrap sample.

Figure 15:
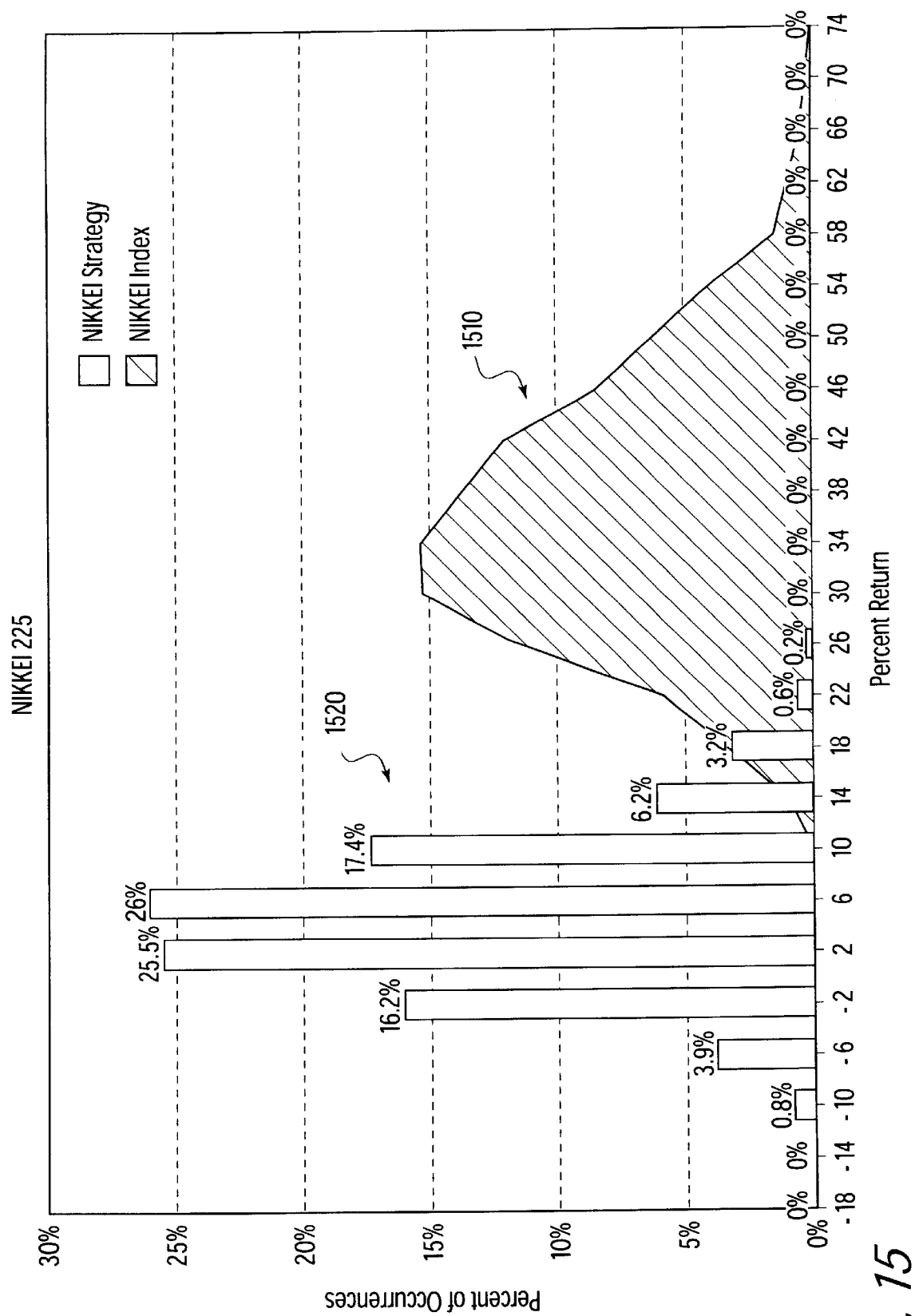
FIG. 15 is an exemplary plot of a resampled statistical analysis comparing two investment strategies with respect to gross rate of returns according to one embodiment of the present invention.

FIG. 15 is an exemplary plot of a resampled statistical analysis comparing two investment strategies with respect to gross rate of returns. As depicted in FIG. 15, investment strategy 1510 outperforms investment strategy 1520.

Figure 16:
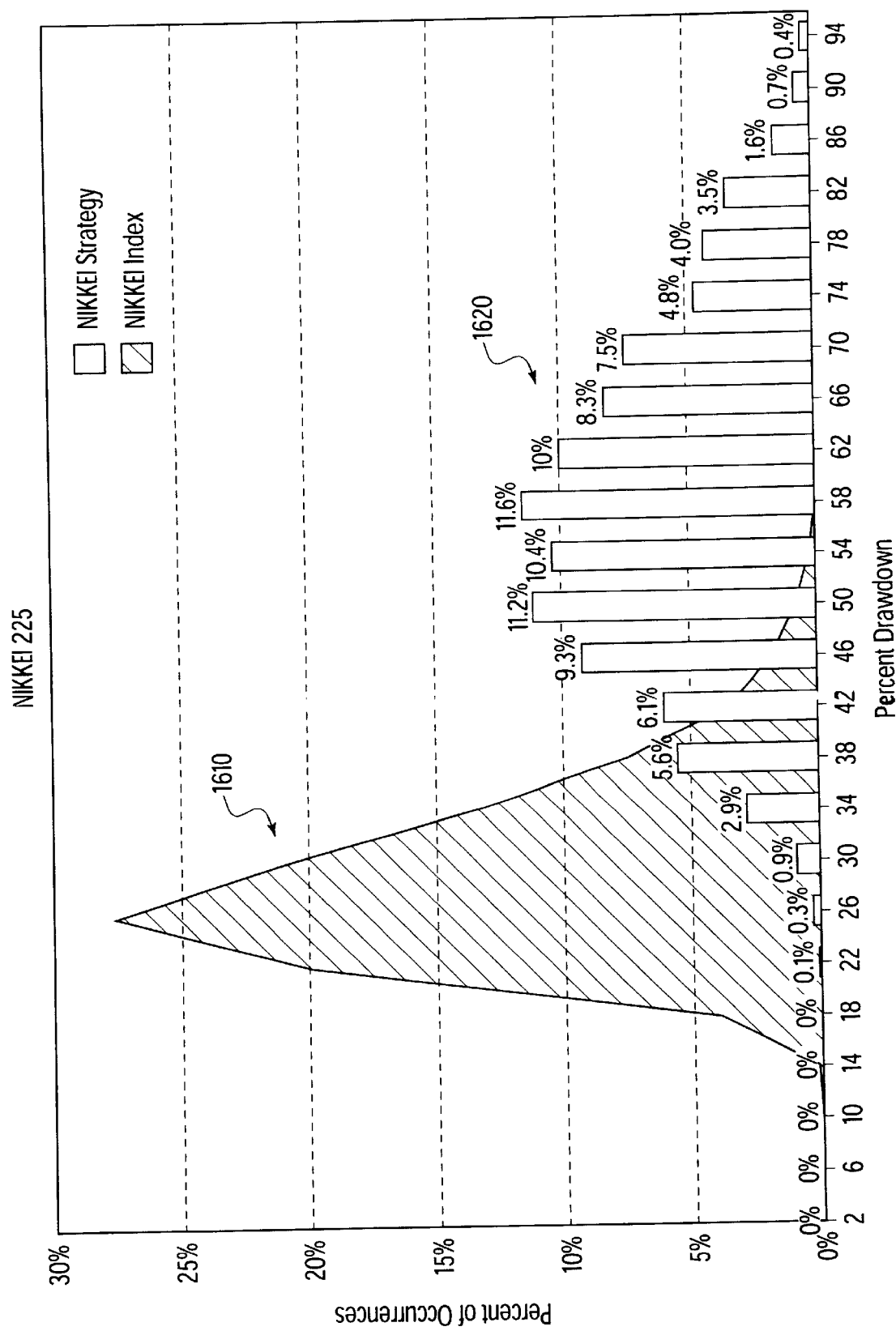
FIG. 16 is an exemplary plot of a resampled statistical analysis comparing two investment strategies with respect to maximum drawdown returns according to one embodiment of the present invention.

FIG. 16 is an exemplary plot of a resampled statistical analysis comparing two investment strategies with respect to maximum drawdown. As depicted in FIG. 16, investment strategy 1610 outperforms investment strategy 1620.

Figure 17:
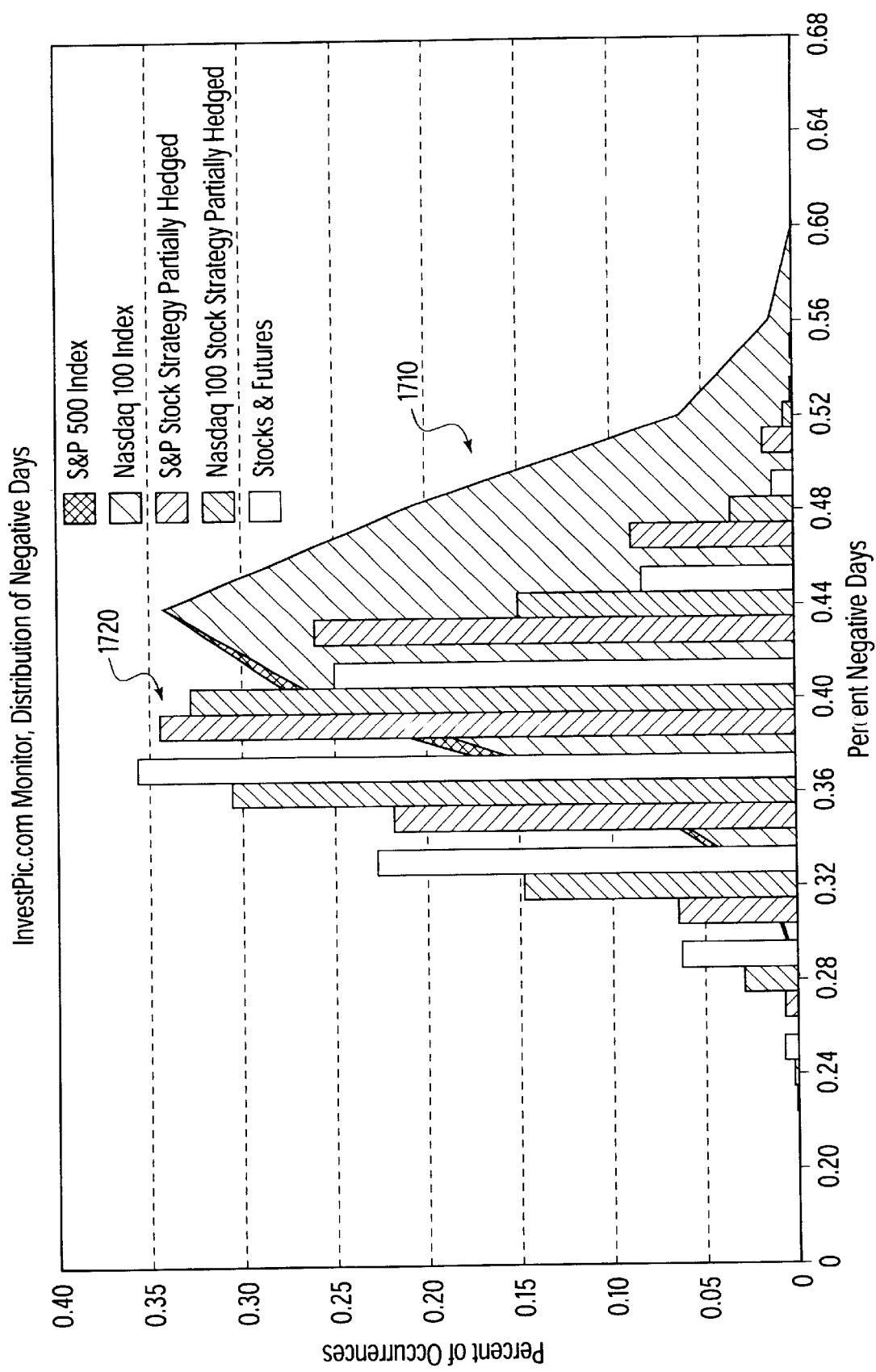
FIG. 17 is an exemplary plot of a resampled statistical analysis comparing multiple investment strategies with respect to a monitor function according to one embodiment of the present invention.

FIG. 17 is an exemplary plot of a resampled statistical analysis comparing two investment strategies with respect to a monitor function. As depicted in FIG. 17, investment strategies 1720 outperforms investment strategy 1710.

What is claimed is:

1. A method for calculating, analyzing and displaying investment data comprising the steps of:

(a) selecting a sample space, wherein the sample space includes at least one investment data sample;

(b) generating a distribution function using a re-sampled statistical method and a bias parameter, wherein the bias parameter determines a degree of randomness in a resampling process; and, (c) generating a plot of the distribution function.

2. The method according to claim 1, wherein the re-sampled statistical method is a bootstrap method.

3. The method according to claim 2, wherein step (b) includes the steps of:

(a) generating at least one bootstrap sample from the sample space; and, (b) for each bootstrap sample, generating a corresponding bootstrap replication.

4. The method according to claim 3, wherein the step of generating at least one bootstrap sample, further includes the steps of randomly selecting a set of Q data points from the sample space, wherein Q is a number of periods.

5. The method according to claim 4, wherein the step of generating a bootstrap replication, further includes the step of taking a predetermined function of a bootstrap sample.

6. The method according to claim 3, further including the steps of:

(a) before step (b), calculating at least one of an autocorrelation function and a partial autocorrelation function of the sample, space for each of at least one lag parameter (a); and, (b) determining a minimum lag parameter, N, wherein the minimum lag parameter N minimizes an autocorrelation function of the sample space.

7. The method according to claim 6, wherein the step of generating at least one bootstrap sample, further includes the steps of:
   (a) randomly selecting a starting point in the sample space;
   (b) selecting a set of N consecutive data points from the sample space; and,
   (c) repeating steps (a)–(b) until at least Q data points have been selected, wherein Q is a number of periods.

8. The method according to claim 1, wherein the re-sampled statistical method is a jackknife method.

9. The method according to claim 1, where in the re-sampled statistical method is a cross-validation method.

10. The method according to claim 5, wherein the predetermined function is one of a gross rate of return function, a maximum drawdown function and a monitor function.

11. A method for providing statistical analysis of investment data over an information network, comprising the steps of:
   (a) storing investment data pertaining to at least one investment;
   (b) receiving a statistical analysis request corresponding to a selected investment;
   (c) receiving a bias parameter, wherein the bias parameter determines a degree of randomness in a resampling process; and,
   (d based upon investment data pertaining to the selected investment, performing a resampled statistical analysis to generate a resampled distribution.

12. The method according to claim 11, further including the steps of generating a plot based upon the resampled distribution.

13. The method according to claim 12, wherein the statistical analysis request includes at least one of an investment identifier, a periods parameter, a function parameter, a replications parameter and a plot parameter.

14. The method according to claim 12, wherein the step of performing a resampled statistical analysis further includes the steps of:
   (a) selecting a sample space;
   (b) generating at least one bootstrap sample from the sample space; and,
   (c) for each bootstrap sample, generating a corresponding bootstrap replication.

15. The method according to claim 14, wherein the step of generating at least one bootstrap sample, further includes the steps of randomly selecting a set of Q data points from the sample space, wherein Q is a number of periods.

16. The method according to claim 14, wherein the step of generating a bootstrap replication, further includes the step of taking a predetermined function of the bootstrap sample.

17. The method according to claim 14, further including the steps of:
   (a) before step (b), calculating at least one of an autocorrelation function and a partial autocorrelation function of the sample space for each of at least one lag parameter (a); and
   (b) determining a minimum lag parameter, N, wherein the minimum lag parameter N minimizes an autocorrelation function of the sample space.

18. The method according to claim 17, wherein the step of generating at least one bootstrap sample, further includes the steps of:
   (a) randomly selecting a starting point in the sample space;
   (b) selecting a set of N consecutive data points from the sample space; and,
   (c) repeating steps (a)–(b) until at least Q data points have been selected, wherein Q is a number of periods.

19. The method according to claim 15, wherein the bias parameter is used to control a degree of randomness in selecting the set of Q data points.

20. The method according to claim 11, wherein the information network is the Internet.

21. The method according to claim 16, wherein the predetermined function is one of a gross rate of returns function, a maximum drawdown function and a monitor function.

22. A system for providing statistical analysis of investment information over an information network comprising:
   a financial data database for storing investment data;
   a client database;
   a plurality of processors collectively arranged to perform a parallel processing computation, wherein the plurality of processors is adapted to:
      receive a statistical analysis request corresponding to a selected investment;
      based upon investment data pertaining to the selected investment, perform a resampled statistical analysis to generate a resampled distribution; and,
      provide a report of the resampled distribution.

23. The system according to claim 22, wherein the report of the resampled distribution is a distribution plot.

24. The system according to claim 22, wherein the statistical analysis request includes at least one of an investment identifier, a bias parameter, a periods parameter and a plot parameter.

25. The system according to claim 22, wherein the processor:
   (a) selects a sample space;
   (b) generates at least one bootstrap sample from the sample space; and,
   (c) for each bootstrap sample, generates a corresponding bootstrap replication.

26. The system according to claim 22, further including an alert rules database, wherein the alert rules database stores at one alert rule record pertaining to a condition upon which a client desires to be notified.

27. The system according to claim 26, wherein the processor, upon the violation of an alert rule based upon a resampled statistical analysis, notifies a client.

28. The system according to claim 27, wherein the client is notified by electronic mail ("e-mail").

29. A system for providing statistical analysis of investment information over an information network comprising:
   a financial data database for storing investment data;
   a front end subsystem for receiving a statistical analysis request;
   a parallel processor, wherein the parallel processor includes:
      at least one processor for performing resampled statistical analysis.

30. The system according to claim 29, wherein the front end subsystem includes a Web server.

31. The system according to claim 29, wherein each of the at last one processor performs a resampled statistical analysis of a financial investment in parallel using financial data stored in a shared memory area.

* * * * *